(12) United States Patent
Seth et al.

(10) Patent No.: US 11,841,973 B2
(45) Date of Patent: Dec. 12, 2023

(54) METHODS FOR AGGREGATING CREDIT ACROSS INTERACTIONS

(71) Applicant: Google LLC, Mountain View, CA (US)

(72) Inventors: Karn Seth, New York, NY (US); Sarvar Patel, Montville, NJ (US); Mariana Raykova, New York, NY (US); Srinivasan Seshadri, Los Altos, CA (US); Margo Narayan, San Francisco, CA (US); Philip McDonnell, Belmont, CA (US); Amin Charaniya, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 300 days.

(21) Appl. No.: 17/285,831

(22) PCT Filed: Aug. 24, 2020

(86) PCT No.: PCT/US2020/047643
§ 371 (c)(1),
(2) Date: Apr. 15, 2021

(87) PCT Pub. No.: WO2021/242290
PCT Pub. Date: Dec. 2, 2021

(65) Prior Publication Data
US 2022/0147650 A1 May 12, 2022

Related U.S. Application Data

(60) Provisional application No. 63/029,835, filed on May 26, 2020.

(51) Int. Cl.
G06F 21/62 (2013.01)
H04L 9/06 (2006.01)
(Continued)

(52) U.S. Cl.
CPC ........ G06F 21/6245 (2013.01); G06F 21/602 (2013.01); G06F 21/62 (2013.01);
(Continued)

(58) Field of Classification Search
CPC .... G06F 21/602; G06F 21/62; G06F 21/6218; G06F 21/6245; G06F 21/6254;
(Continued)

(56) References Cited

U.S. PATENT DOCUMENTS

| 2015/0186403 | A1 | 7/2015 | Srivastava et al. |
| 2016/0078431 | A1* | 3/2016 | Ramachandran .. G06Q 30/0605 705/64 |
| 2020/0327252 | A1* | 10/2020 | Mcfall ................ G06F 21/6254 |

OTHER PUBLICATIONS

International Search Report and Written Opinion for PCT Appln. Ser. No. PCT/US2020/047643 dated Feb. 4, 2021 (12 pages).
(Continued)

*Primary Examiner* — D'Arcy Winston Straub
(74) *Attorney, Agent, or Firm* — Dority & Manning, P.A.

(57) ABSTRACT

A method disclosed herein may include receiving, at a first computing system, encrypted identifiers and encrypted values, performing, by the first computing system, a concealing operation on the encrypted identifiers to produce concealed encrypted identifiers, wherein the concealing operation conceals the encrypted identifiers from the first computing system and a second computing system but enables matching between the concealed encrypted identifiers, decrypting, by the second computing system, the concealed encrypted identifiers to produce concealed identifiers, and performing, by the second computing system, an aggregation operation using the concealed identifiers and the encrypted values to produce an encrypted aggregate value without accessing personally identifiable information associated with the encrypted values.

16 Claims, 15 Drawing Sheets

(51) Int. Cl.
H04L 9/08 (2006.01)
H04L 9/14 (2006.01)
H04L 9/00 (2022.01)
G06F 21/60 (2013.01)

(52) U.S. Cl.
CPC .......... *G06F 21/6254* (2013.01); *H04L 9/008* (2013.01); *H04L 9/0643* (2013.01); *H04L 9/0869* (2013.01); *H04L 9/14* (2013.01); *G06F 2221/2107* (2013.01)

(58) Field of Classification Search
CPC ... G06F 2221/2107; H04L 9/008; H04L 9/06; H04L 9/0643; H04L 9/08; H04L 9/0861; H04L 9/0869; H04L 9/14
See application file for complete search history.

(56) References Cited

OTHER PUBLICATIONS

International Preliminary Report on Patentability for Application No. PCT/US2020/047643, dated Dec. 8, 2022, 9 pages.

* cited by examiner

METHODS FOR AGGREGATING CREDIT ACROSS INTERACTIONS

CROSS-REFERENCE TO RELATED APPLICATIONS

The present application is a National Stage Application, filed under 35 U.S.C. 371, of International Patent Application No. PCT/US2020/047643 filed on Aug. 24, 2020 titled "METHODS FOR AGGREGATING CREDIT ACROSS INTERACTIONS," which in turn claims priority to U.S. Patent Application No. 63/029,835 filed on May 26, 2020 titled "METHODS FOR AGGREGATING CREDIT ACROSS INTERACTIONS." to the entireties of which are incorporated by reference herein.

BACKGROUND

It can be helpful for analytics systems to be able to determine aggregated information about interactions with content, such as how many devices interacted with a particular item of content. However, there is often an interest in maintaining the privacy of information. For example, an entity may be interested in receiving information about how many devices a particular type of content reached or how many devices interacted in a particular way with the content without receiving information that could identify, a source of the information, such as an identifier associated with the devices.

SUMMARY

One implementation of the disclosure relates to a method including receiving, at a first computing system, encrypted identifiers and encrypted values, performing, by the first computing system, a concealing operation on the encrypted identifiers to produce concealed encrypted identifiers, wherein the concealing operation conceals the encrypted identifiers from the first computing system and a second computing system but enables matching between the concealed encrypted identifiers, decrypting, by the second computing system, the concealed encrypted identifiers to produce concealed identifiers, and performing, by the second computing system, an aggregation operation using the concealed identifiers and the encrypted values to produce an encrypted aggregate value without accessing personal information associated with the encrypted values.

In some implementations, performing the concealing operation includes removing a first portion of first encryption from the encrypted identifiers to produce partially encrypted identifiers, and deterministically encrypting the partially encrypted identifiers with second encryption to produce the concealed encrypted identifiers. In some implementations, decrypting the concealed encrypted identifiers includes removing a second portion of the first encryption from the concealed encrypted identifiers to produce concealed identifiers. In some implementations, the method further includes decrypting, by a third computing system, the encrypted aggregate value to produce an aggregate value. In some implementations, the method further includes cooperatively generating by the first computing system and the second computing system a first encryption key, generating by the first computing system a second encryption key associated with the first encryption key and a third encryption key, generating by the second computing system a fourth encryption key associated with the first encryption key, and generating by the third computing system a fifth and sixth encryption key.

In some implementations, the encrypted identifiers are encrypted using the first encryption key and the encrypted values are encrypted using the fifth encryption key, wherein the concealing operation uses the second and third encryption keys, wherein the concealed encrypted identifiers are decrypted using the fourth encryption key, and wherein the encrypted aggregate value is decrypted using the sixth encryption key. In some implementations, the concealing operation includes shuffling the encrypted identifiers and rerandomizing the encrypted values by generating a ciphertext using a hash function. In some implementations, the third computing system is part of the first computing system. In some implementations, at least one of the first computing system or the third computing system is a distributed computing system. In some implementations, the method further includes generating, by the second computing system, a random value, performing, by the second computing system, an operation using the random value and the encrypted aggregate value to produce a result, and sending, by the second computing system, the random value to a content publisher associated with the encrypted identifiers. In some implementations, the aggregation operation includes performing a weighting function using the concealed identifiers and time values associated with the concealed identifiers to produce the encrypted aggregate value.

Another implementation of the disclosure relates to an outcome measurement system including a first computing system configured to receive encrypted identifiers and encrypted values, and perform a concealing operation on the encrypted identifiers to produce concealed encrypted identifiers, wherein the concealing operation conceals the encrypted identifiers from the first computing system and a second computing system but enables matching between the concealed encrypted identifiers, and the second computing system configured to decrypt the concealed encrypted identifiers to produce concealed identifiers, and perform an aggregation operation using the concealed identifiers and the encrypted values to produce an encrypted aggregate value without accessing personally identifiable information associated with the encrypted values.

In some implementations, performing the concealing operation includes removing a first portion of first encryption from the encrypted identifiers to produce partially encrypted identifiers, and deterministically encrypting the partially encrypted identifiers with second encryption to produce the concealed encrypted identifiers. In some implementations, decrypting the concealed encrypted identifiers includes removing a second portion of the first encryption from the concealed encrypted identifiers to produce concealed identifiers. In some implementations, the outcome measurement system further includes a third computing system configured to decrypt the encrypted aggregate value to produce an aggregate value. In some implementations, the first and second computing systems are further configured to cooperatively generate a first encryption key, wherein the first computing system is further configured to generate a second encryption key associated with the first encryption key and a third encryption key, wherein the second computing system is further configured to generate a fourth encryption key associated with the first encryption key, and wherein the third computing system is further configured to generate a fifth and sixth encryption key.

In some implementations, the encrypted identifiers are encrypted using the first encryption key and the encrypted values are encrypted using the fifth encryption key, wherein the concealing operation uses the second and third encryption keys, wherein the concealed encrypted identifiers are decrypted using the fourth encryption key, and wherein the encrypted aggregate value is decrypted using the sixth encryption key. In some implementations, the third computing system is part of the first computing system. In some implementations, at least one of the first computing system or the third computing system is a distributed computing system. In some implementations, the aggregation operation includes performing a weighting function using the concealed identifiers and time values associated with the concealed identifiers to produce the encrypted aggregate value.

Another implementation of the disclosure relates to one or more computer-readable storage media having instructions stored thereon that, upon execution by one or more processors of at least one of a first computing system and a second computing system cause the first computing system to receive encrypted identifiers and encrypted values, and perform a concealing operation on the encrypted identifiers to produce concealed encrypted identifiers, wherein the concealing operation conceals the encrypted identifiers from the first computing system and a second computing system but enables matching between the concealed encrypted identifiers, and cause the second computing system to decrypt the concealed encrypted identifiers to produce concealed identifiers, and perform an aggregation operation using the concealed identifiers and the encrypted values to produce an encrypted aggregate value without accessing personally identifiable information associated with the encrypted values.

In some implementations, performing the concealing operation includes removing a first portion of first encryption from the encrypted identifiers to produce partially encrypted identifiers, and deterministically encrypting the partially encrypted identifiers with second encryption to produce the concealed encrypted identifiers. In some implementations, decrypting the concealed encrypted identifiers includes removing a second portion of the first encryption from the concealed encrypted identifiers to produce concealed identifiers. In some implementations, the instructions are further configured to, upon execution by one or more processors of a third computing system, cause the third computing system to decrypt the encrypted aggregate value to produce an aggregate value. In some implementations, the instructions are configured to cause the first and second computing systems to cooperatively generate a first encryption key, wherein the instructions are configured to cause the first computing system to generate a second encryption key associated with the first encryption key and a third encryption key, wherein the instructions are configured to cause the second computing system to generate a fourth encryption key associated with the first encryption key, and wherein the instructions are configured to cause the third computing system to generate a fifth and sixth encryption key. In some implementations, the encrypted identifiers are encrypted using the first encryption key and the encrypted values are encrypted using the fifth encryption key, wherein the concealing operation uses the second and third encryption keys, wherein the concealed encrypted identifiers are decrypted using the fourth encryption key, and wherein the encrypted aggregate value is decrypted using the sixth encryption key. In some implementations, the third computing system is part of the first computing system. In some implementations, at least one of the first computing system or the third computing system is a distributed computing system. In some implementations, the aggregation operation includes performing a weighting function using the concealed identifiers and time values associated with the concealed identifiers to produce the encrypted aggregate value.

The various aspects and implementations may be combined where appropriate.

DETAILED DESCRIPTION

Figure 1A:
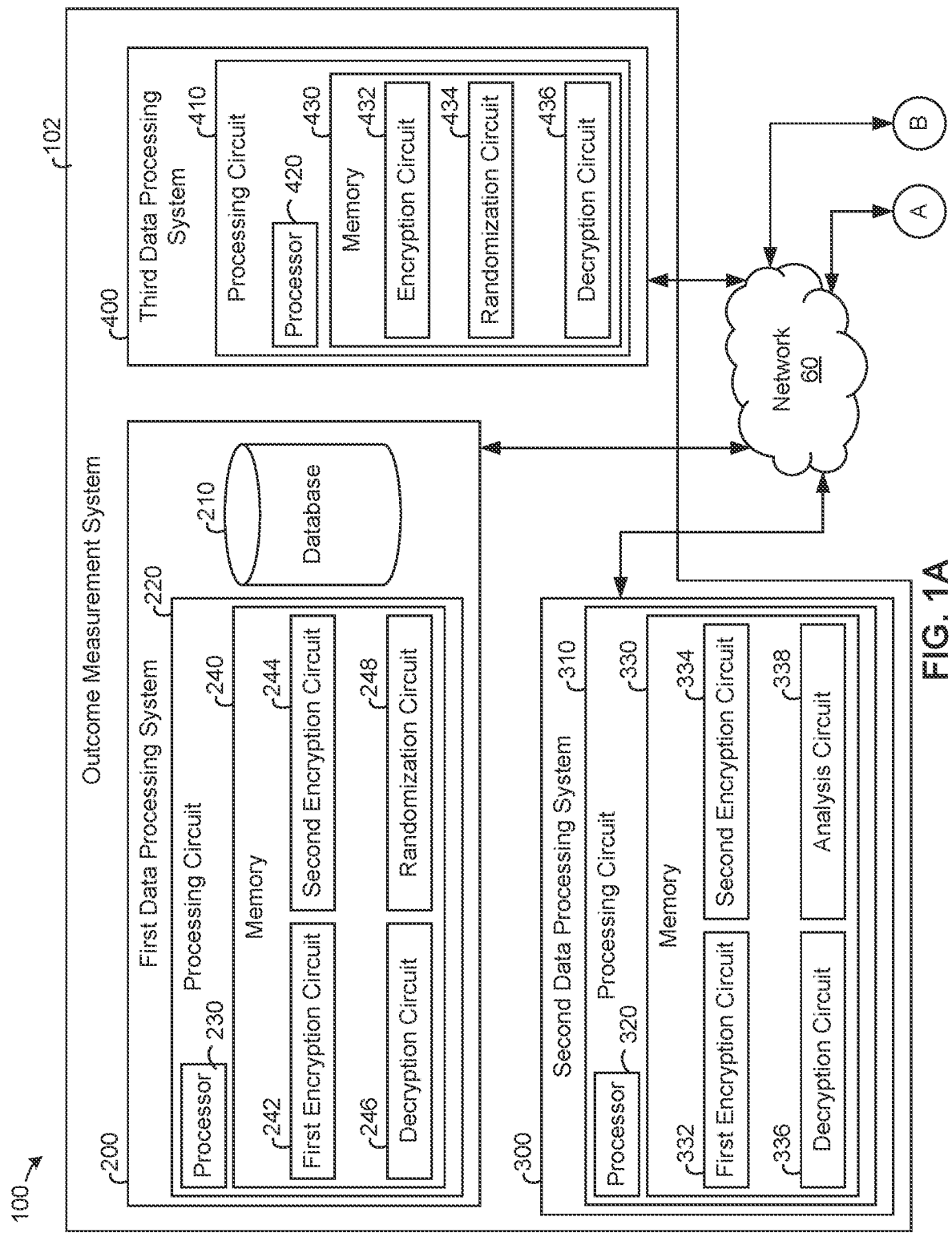
FIGS. 1A-1B are a diagram illustrating various entities interacting over a network, according to an illustrative implementation.

Following below are more detailed descriptions of various concepts related to, and implementations of, methods, apparatuses, and systems for aggregating credit across interactions in a privacy conscious manner. The various concepts introduced above and discussed in greater detail below may be implemented in any of numerous ways, as the described concepts are not limited to any particular manner of implementation.

In many domains, it may be necessary or desirable to determine an aggregate number of interactions attributed to a content publisher. For example, a number of content publishers may display a number of content items that a user views before performing an online interaction, and it may be desirable to determine the number of online interactions associated with each content publisher's content items (e.g., how many users viewed a particular content item before performing the online interaction).

System and methods of the present disclosure relate generally to aggregating a number of interactions associated with a content item and distributing credit between a number of content publishers and/or interaction pathways associated with the content item. More specifically, systems and methods of the present disclosure relate to unique cryptography and computer architecture methodologies to aggregate data from different entities and distribute credit between the entities in a more secure way. Typically, aggregating data from different entities requires a computing system to have access to user specific data. For example, a system may determine an aggregate count by summing values having matching user identifiers. To avoid revealing personal information, the identity of the user must be hidden and suitably protected when generating and reporting the data.

It is desirable to conduct certain analysis activities in a manner that protects against the exposure of personal information. Therefore, there is a need for a unique cryptography and computer architecture methodology to aggregate data from different entities in a more secure way. Aspects of the present disclosure provide improved encryption methods and computer architectures. The encryption methods and architectures may be used to correlate online interactions with data from content publishers in a secure way, while providing increased security and also conserving user privacy.

To ensure the privacy and security of personal information, systems and methods of the present disclosure process data to prevent entities (e.g., a content provider, a third party, etc.) from receiving personal information. A non-limiting example implementation is as follows: a second data processing system may produce a first public key for asymmetric encryption. A publisher computing system may encrypt first user identifiers using the first public key. A third data processing system may produce a second public key for homomorphic encryption. An interaction data provider computing system may encrypt second user identifiers using the first public key and associated values with the second public key. A first data processing system may receive, from a number of content publishers (e.g., publisher computing system, etc.), a number of encrypted first user identifiers. The first data processing system may receive, from one or more interaction data providers (e.g., interaction data provider computing system, etc.), a number of encrypted second user identifiers and associated encrypted values. The first data processing system may generate a secret key for elliptic curve encryption and may encrypt the encrypted first and second user identifiers with the secret key to produce double-encrypted first and second user identifiers. The first data processing system may send the double-encrypted first and second user identifiers and the associated encrypted values to the second data processing system which may decrypt the double-encrypted first and second user identifiers to produce elliptic curve (EC) encrypted first and second user identifiers. The second data processing system may join the EC encrypted first and second user identifiers and compute an encrypted aggregate value associated with each content publisher based on the joined EC encrypted first and second user identifiers. The second data processing system may send the encrypted aggregate value to the third data processing system which may decrypt the encrypted aggregate value to recover an aggregate value associated with each content publisher. Therefore, the outcome measurement system (e.g., first, second, and third data processing systems, etc.) may facilitate aggregation of interaction data without revealing personal information.

In some implementations of the present disclosure, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personal information, or only certain personal information, can be determined for the user, or a user's geographic location may be generalized where location information is obtained (such as to a city. ZIP code, or state level), so that a particular location of a user cannot be determined. Thus, the user may have control over what information is collected about the user, how that information is used, and what information is provided to the user.

Figure 1B:
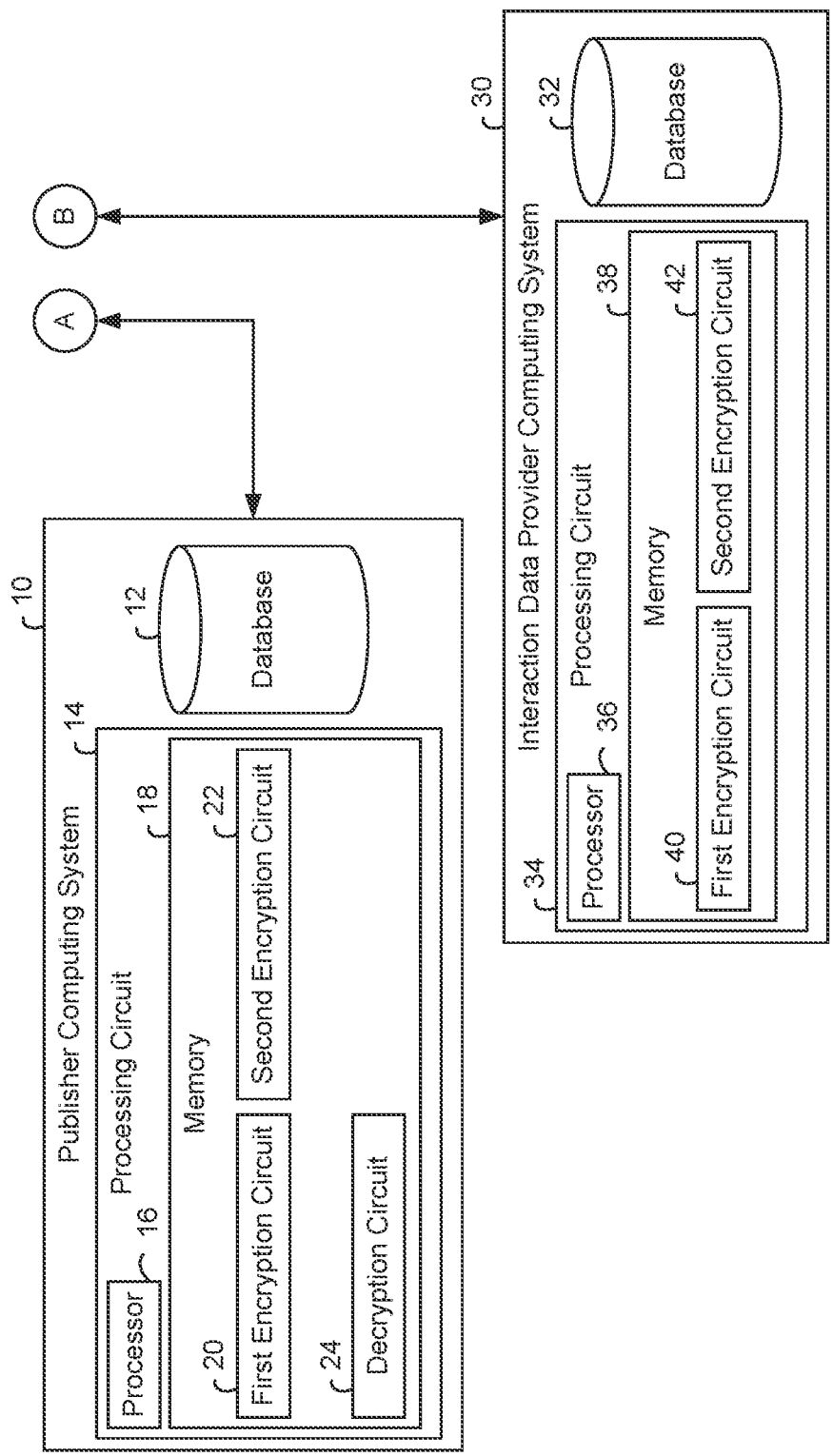

Referring now to FIGS. 1A-1B, system 100 for securely aggregating data from different entities is shown, according to an illustrative implementation. System 100 includes outcome measurement service 102, publisher computing system 10, and interaction data provider computing system 30. In various implementations, outcome measurement service 102 includes first data processing system 200, second data processing system 300, and third data processing system 400. In various implementations, components of system 100 communicate over network 60. Network 60 may include computer networks such as the Internet, local, wide, metro or other area networks, intranets, satellite networks, other computer networks such as voice or data mobile phone communication networks, combinations thereof, or any other type of electronic communications network. Network 60 may include or constitute a display network (e.g., a subset of information resources available on the Internet that are associated with a content placement or search engine results system, or that are eligible to include third party content items as part of a content item placement campaign). In various implementations, network 60 facilitates secure communication between components of system 100. As a non-limiting example, network 60 may implement transport layer security (TLS), secure sockets layer (SSL), hypertext transfer protocol secure (HTTPS), and/or any other secure communication protocol.

Publisher computing system 10 may host publisher data such as user identifiers. In various implementations, publisher computing system 10 is associated with a publisher (e.g., an online publisher, etc.). In various implementations, the publisher data is associated with user interactions with publisher content. For example, the publisher data may include user identifiers and timestamps associated with users that interacted with publisher content. In some implementations, the publisher data includes a count of user interactions. In some implementations, the publisher data includes an interaction classification. For example, the publisher data may include an interaction classification indicating whether a user viewed a content item or interacted with a content item (e.g., clicked on a content item, etc.). In various implementations, the publisher content may be marketing items (e.g., advertisements) associated with a third party.

Publisher computing system 10 may include database 12 and processing circuit 14. Database 12 may store publisher data. For example, upon serving a publisher content item to a client device, publisher computing system 10 may store a user identifier associated with a user in database 12. The user identifier may be used later for correlation of anonymous interaction data. Database 12 may include one or more storage mediums. The storage mediums may include but are not limited to magnetic storage, optical storage, flash storage, and/or RAM. Publisher computing system 10 may implement or facilitate various APIs to perform database functions (i.e., managing data stored in database 12). The APIs can be but are not limited to SQL, ODBC. JDBC, and/or any other data storage and manipulation API.

Processing circuit 14 includes processor 16 and memory 18. Memory 18 may have instructions stored thereon that, when executed by processor 16, cause processing circuit 14 to perform the various operations described herein. The operations described herein may be implemented using software, hardware, or a combination thereof. Processor 16 may include a microprocessor, ASIC. FPGA, etc., or combinations thereof. In many implementations, processor 16 may be a multi-core processor or an array of processors. Processor 16 may implement or facilitate secure environments. For example, processor 16 may implement software guard extensions (SGX) to define private regions (e.g., enclaves) in memory 18. Memory 18 may include, but is not limited to, electronic, optical, magnetic, or any other storage devices capable of providing processor 16 with program instructions. Memory 18 may include a floppy disk, CD-ROM, DVD, magnetic disk, memory chip, ROM, RAM, EEPROM, EPROM, flash memory, optical media, or any other suitable memory from which processor 16 can read instructions. The instructions may include code from any suitable computer programming language such as, but not limited to, C, C++, C#, Java, JavaScript, Perl, HTML, XML, Python and Visual Basic.

Memory 18 may include first encryption circuit 20, second encryption circuit 22, and decryption circuit 24. In the illustrated implementation, circuits 20, 22, and 24 may be implemented using computer or machine-readable instructions stored within memory 18. In other implementations, circuits 20, 22, and 24 may be discrete hardware circuits or may be implemented using a combination of hardware and software. First encryption circuit 20 may implement one or more encryption functions on input data to produce encrypted data. In some implementations, first encryption circuit 20 implements an asymmetric encryption function. In various implementations, first encryption circuit 20 implements an ElGamal (EG) encryption protocol. For example, first encryption circuit 20 may encrypt user identifiers with an EG public key received from second data processing system 300. In various implementations, first encryption circuit 20 implements commutative encryption. For example, first encryption circuit 20 may implement EG encryption that facilitates double-encrypted values (e.g., a single value encrypted with two different encryption schemes). In various implementations, first encryption circuit facilitates randomized encryption. For example, first encryption circuit 20 may encrypt a first value using a first key to produce a first encrypted result and may encrypt the first value again using the first key to produce a second encrypted result that is different than the first encrypted result (e.g., produces different ciphertexts). In various implementations, first encryption circuit 20 facilitates rerandomization.

Second encryption circuit 22 may implement one or more encryption functions on input data to produce encrypted data. In some implementations, second encryption circuit 22 implements an asymmetric encryption function. In various implementations, second encryption circuit 22 generates encryption keys. For example, second encryption circuit 22 may generate a public key and a secret key. In some implementations, second encryption circuit 22 shares the encryption keys with other components of system 100 (e.g., second data processing system 300, etc.). For example, second encryption circuit 22 may generate a public key and send the public key to second data processing system 300. In various implementations, second encryption circuit 22 implements commutative encryption as described above in reference to first encryption circuit 20.

Decryption circuit 24 may receive encrypted data and decrypt it to produce unencrypted data. In various implementations, decryption circuit 24 receives encrypted data from third data processing system 400. Decryption circuit 24 may decrypt asymmetrically encrypted data. Additionally or alternatively, decryption circuit 24 may decrypt symmetric and/or threshold encrypted data. In various implementations, decryption circuit 24 receives one or more secrets (e.g., secret keys, etc.) from second encryption circuit 22. For example, decryption circuit 24 may receive a secret key from second encryption circuit 22 and use the secret key to decrypt encrypted data received from third data processing system 400.

Interaction data provider computing system 30 may host interaction data such as user identifiers and/or values. In various implementations interaction data provider computing system 30 is associated with an interaction data provider (e.g., a merchant, an interaction data clearinghouse, etc.). In various implementations, the interaction data is associated with user commercial activity (e.g., purchases, etc.). For example, the interaction data may include user identifiers of users that performed an online transaction. In various implementations, the interaction data may include a timestamp and/or value associated with the interaction. In some implementations, the interaction data includes an interaction classification. For example, the interaction data may include an interaction classification indicating a type of interaction (e.g., a website visit, a purchase, etc.). In various implementations, the interaction data may be associated with the publisher data described in reference to publisher computing system 10. For example, the interaction data may include user identifiers that overlap with a portion of the user identifiers in the publisher data.

Interaction data provider computing system 30 may include database 32 and processing circuit 34. Database 32 may store interaction data. For example, upon detecting a user interaction, interaction data provider computing system 30 may store a user identifier associated with a user in database 32. The user identifier may be used later for correlation of anonymous interaction data. Database 32 may include one or more storage mediums. The storage mediums may include but are not limited to magnetic storage, optical storage, flash storage, and/or RAM. Interaction data provider computing system 30 may implement or facilitate various APIs to perform database functions (i.e., managing data stored in database 32). The APIs can be but are not limited to SQL, ODBC, JDBC, and/or any other data storage and manipulation API.

Processing circuit 34 includes processor 36 and memory 38. Memory 38 may have instructions stored thereon that, when executed by processor 36, cause processing circuit 34 to perform the various operations described herein. The operations described herein may be implemented using software, hardware, or a combination thereof. Processor 36 may include a microprocessor, ASIC, FPGA, etc., or combinations thereof. In many implementations, processor 16 may be a multi-core processor or an array of processors. Processor 36 may implement or facilitate secure environments as described above. Memory 38 may include, but is not limited to, electronic, optical, magnetic, or any other storage devices capable of providing processor 36 with program instructions. Memory 38 may include a floppy disk, CD-ROM, DVD, magnetic disk, memory chip, ROM, RAM, EEPROM, EPROM, flash memory, optical media, or any other suitable memory from which processor 16 can read instructions. The instructions may include code from any suitable computer programming language such as, but not limited to, C, C++, C#, Java, JavaScript, Perl, HTML, XML, Python and Visual Basic.

Memory 38 may include first encryption circuit 40 and second encryption circuit 42. First encryption circuit 40 may implement one or more encryption functions on input data to produce encrypted data. In some implementations, first encryption circuit 40 implements an asymmetric encryption function. In various implementations, first encryption circuit 40 implements (EG) encryption. For example, first encryption circuit 40 may encrypt user identifiers with an EG public key received from second data processing system 300. In various implementations, first encryption circuit 40 facilitates various cryptographic functions (e.g., commutativity, rerandomization, etc.) as described in reference to first encryption circuit 20.

Second encryption circuit 42 may implement one or more encryption functions on input data to produce encrypted data. In some implementations, second encryption circuit 42 implements an asymmetric encryption function. For example, second encryption circuit 42 may implement a homomorphic cryptosystem. In some implementations, second encryption circuit 42 implements an additive encryption function. For example, second encryption circuit 42 may implement Additive Homomorphic Encryption (AHE). In various implementations, second encryption circuit 42 implements an Exponential ElGamal (EEG) protocol. Additionally or alternatively, second encryption circuit 42 may implement a Paillier cryptosystem and/or Ring-LWE based encryption. In some implementations, second encryption circuit 42 implements a symmetric encryption function. In various implementations, second encryption circuit 42 encrypts values with an AHE public key received from third data processing system 400. In some implementations, second encryption circuit 42 facilitates homomorphic scalar multiplication. In various implementations, second encryption circuit 42 facilitates various cryptographic functions (e.g., commutativity, rerandomization, etc.) as described in reference to first encryption circuit 20.

Referring now specifically to FIG. 1A, first data processing system 200 may facilitate processing of publisher data and/or interaction data. In various implementations, first data processing system 200 receives data and processes the data to produce processed data (e.g., data without or with less personal information, etc.). In some implementations, first data processing system 200 produces differentially-private data. In some implementations, first data processing system 200 generates encryption keys. For example, first data processing system 200 may collaboratively generate an EG public key with second data processing system 300. First data processing system 200 may be a server, distributed processing cluster, cloud processing system, or any other computing device. First data processing system 200 may include or execute at least one computer program or at least one script. In some implementations, first data processing system 200 includes combinations of software and hardware, such as one or more processors configured to execute one or more scripts.

First data processing system 200 is shown to include database 210 and processing circuit 220. Database 210 may store data received from publisher computing system 10 and/or interaction data provider computing system 30. For example, database 210 may store encrypted first identifiers from publisher computing system 10 and/or encrypted second identifiers and/or encrypted values from interaction data provider computing system 30. Database 210 may include various storage mediums as described with reference to database 12 and 32.

Processing circuit 220 includes processor 230 and memory 240. Memory 240 may have instructions stored thereon that, when executed by processor 230, cause processing circuit 220 to perform the various operations described herein. Processing circuit 220, processor 230, and/or memory 240 may be similar to processing circuit 14 and 34, processor 16 and 36, and/or memory 18 and 38 as described above. Memory 240 may include first encryption circuit 242, second encryption circuit 244, decryption circuit 246, and randomization circuit 248.

First encryption circuit 242 may implement one or more encryption functions on input data to produce encrypted data. In some implementations, first encryption circuit 242 implements an asymmetric encryption function (e.g., EG, etc.). In some implementations, first encryption circuit 242 implements EG encryption over an elliptic curve. For example, first encryption circuit 242 may implement EG encryption over an elliptic curve used by second encryption circuit 244 to implement EC encryption. In various implementations, first encryption circuit 242 generates encryption keys. For example, first encryption circuit 242 may generate a public key and a secret key. In some implementations, first encryption circuit 242 collaboratively generates an EG public key with second data processing system 300. In some implementations, first encryption circuit 242 shares the encryption keys (or a portion thereof) with other components of system 100 (e.g., publisher computing system 10, interaction data provider computing system 30, etc.). For example, first encryption circuit 242 may collaboratively generate an EG public key with second data processing system 300 and send the EG public key to publisher computing system 10 and/or interaction data provider computing system 30. In various implementations, first encryption circuit 242 facilitates various cryptographic functions (e.g., commutativity, rerandomization, etc.) as described in reference to first encryption circuit 20.

Second encryption circuit 244 may implement one or more encryption functions on input data to produce encrypted data. In various implementations, second encryption circuit 244 implements a symmetric encryption function. For example, second encryption circuit 244 may implement Elliptic Curve (EC) encryption. Additionally or alternatively, second encryption circuit 244 may implement any cryptosystem where the Decisional Diffie-Hellman (DDH) problem is presumed to be computationally intractable, such that the multiplicative group of quadratic residues modulo a safe prime number. In some implementations, second encryption circuit 244 implements an asymmetric encryption function. In various implementations, second encryption circuit 244 generates an encryption key. For example, second encryption circuit 244 may generate an EC secret key. In some implementations, second encryption circuit 244 collaboratively generates a number of EC secret keys with other second encryption circuits 244 (e.g., for collaborative encryption, etc.). In various implementations, second encryption circuit 244 encrypts identifiers with an EC secret key. In various implementations, second encryption circuit 244 implements deterministic encryption. For example, second encryption circuit 244 may encrypt a first value with a first key to produce a first encrypted result and may encrypt the first value again with the first key to produce a second encrypted result that is the same as the first encrypted result. In various implementations, second encryption circuit 244 facilitates generating encrypted data that may be compared for equality (e.g., compare two values encrypted with the same key, etc.). In various implementations, second encryption circuit 244 facilitates various cryptographic functions (e.g., commutativity, rerandomization, etc.) as described in reference to first encryption circuit 20. In some implementations, second encryption circuit 244 facilitates collaborative encryption. For example, a number of second encryption circuits 244 may work together to encrypt a data item (e.g., each adding a portion of encryption, etc.).

Decryption circuit 246 may receive encrypted data and decrypt it to produce unencrypted data. In various implementations, decryption circuit 246 receives encrypted data from publisher computing system 10 and/or interaction data provider computing system 30. For example, decryption circuit 246 may receive encrypted first identifiers from publisher computing system 10 and/or encrypted second identifiers from interaction data provider computing system 30. Decryption circuit 246 may decrypt asymmetrically encrypted data. Additionally or alternatively, decryption circuit 246 may decrypt symmetric and/or threshold encrypted data. In various implementations, decryption circuit 246 receives one or more secrets (e.g., secret keys, etc.) from first encryption circuit 242. For example, decryption circuit 246 may receive a secret key (e.g., an EG secret key, etc.) from first encryption circuit 242 and use the secret key to at least partially decrypt encrypted data received from publisher computing system 10 and/or interaction data provider computing system 30.

Randomization circuit 248 may receive data and perform various randomization functions to produce randomized data. As a non-limiting example, randomization circuit 248 may facilitate removing implicit/indirect identifiers (e.g., arrival time, order, originating IP address, etc.), performing batching operations, introducing noise, and/or performing any other anonymizing operation. In various implementations, randomization circuit 248 shuffles (e.g., rearranges, changes an order of, etc.) received data to produce shuffled data. In some implementations, randomization circuit 248 implements one or more hashing functions on input data to produce hashed data. For example, randomization circuit 248 may implement SHA-2, Scrypt, Balloon, and/or Argon2 hashing functions. In some implementations, randomization circuit 248 facilitates rerandomizing ciphertexts by applying subsequent rounds of encryption. For example, randomization circuit 248 may rerandomize an EG encrypted value by encrypting the EG encrypted value a second time with the same key used to encrypt the EG encrypted value the first time.

Second data processing system 300 may facilitate securely correlating data from different entities. In various implementations, second data processing system 300 receives encrypted publisher data and/or encrypted interaction data and processes the received data to generate aggregate interaction data (e.g., aggregate values, etc.). For example, second data processing system 300 may perform an aggregation operation to join user identifiers, determine an aggregate value associated with an interaction, and distribute credit among various publishers. Second data processing system 300 may include or execute at least one computer program or at least one script. In some implementations, second data processing system 300 includes combinations of software and hardware, such as one or more processors configured to execute one or more scripts.

Second data processing system 300 is shown to include processing circuit 310 having processor 320 and memory 330. Memory 330 may have instructions stored thereon that, when executed by processor 320, cause processing circuit 310 to perform the various operations described herein. Processing circuit 310, processor 320, and/or memory 330 may be similar to processing circuit 14 and 34, processor 16 and 36, and/or memory 18 and 38 as described above. Memory 330 may include first encryption circuit 332, second encryption circuit 334, decryption circuit 336, and analysis circuit 338.

First encryption circuit 332 may implement one or more encryption functions on input data to produce encrypted data. In some implementations, first encryption circuit 332 implements an asymmetric encryption function (e.g., EG, etc.). In some implementations, first encryption circuit 332 implements EG encryption over an elliptic curve. For example, first encryption circuit 332 may implement EG encryption over an elliptic curve used by second encryption circuit 244 to implement EC encryption. In various implementations, first encryption circuit 332 is similar to first encryption circuit 242. In some implementations, first encryption circuit 332 generates encryption keys. For example, first encryption circuit 332 may generate a public key (e.g., an EG public key) and a secret key (e.g., an EG secret key). In some implementations, first encryption circuit 332 collaboratively generates an EG public key with first data processing system 200. In some implementations, first encryption circuit 332 shares the encryption keys (or a portion thereof) with other components of system 100 (e.g., publisher computing system 10, interaction data provider computing system 30, etc.). In various implementations, first encryption circuit 332 facilitates various cryptographic functions (e.g., commutativity, rerandomization, etc.) as described in reference to first encryption circuit 20

Second encryption circuit 334 may implement one or more encryption functions on input data to produce encrypted data. In some implementations, second encryption circuit 334 implements an asymmetric encryption function. For example, second encryption circuit 334 may implement a Rivest-Shamir-Adleman (RSA) cryptosystem. As an additional example, second encryption circuit 334 may encrypt a random value with a public key received from publisher computing system 10. In various implementations, second encryption circuit 334 implements a masking operation. For example, second encryption circuit 334 may mask an encrypted aggregate value to produce an encrypted masked aggregate value. The masking operation is described in more detail with reference to FIG. 11.

Decryption circuit 336 may receive encrypted data and decrypt it to produce unencrypted data. In various implementations, decryption circuit 336 receives encrypted data from first data processing system 200. For example, decryption circuit 336 may receive encrypted first and second identifiers from first data processing system 200. Decryption circuit 336 may decrypt asymmetrically encrypted data. Additionally or alternatively, decryption circuit 336 may decrypt symmetric and/or threshold encrypted data. In various implementations, decryption circuit 336 receives one or more secrets (e.g., secret keys, etc.) from first encryption circuit 332. For example, decryption circuit 336 may receive a secret key (e.g., an EG secret key, etc.) from first encryption circuit 332 and use the secret key to at least partially decrypt encrypted data received from first data processing system 200.

Analysis circuit 338 may receive anonymous (e.g., encrypted, etc.) publisher data and/or interaction data and produce aggregate interaction data (e.g., aggregate values, etc.). In various implementations, analysis circuit 338 performs statistical operations on received data to produce statistical measurements describing the received data. For example, analysis circuit 338 may determine an aggregate value associated with online interactions with a publisher. In various implementations, analysis circuit 338 facilitates joining user identifiers. For example, analysis circuit 338 may join first user identifiers from publisher data with second user identifiers from interaction data. In various implementations, analysis circuit 338 facilitates joining encrypted identifiers, thereby preserving user privacy. In some implementations, analysis circuit 338 facilitates distributing credit between publishers associated with an online interaction.

Third data processing system 400 may facilitate securely distributing aggregate interaction data (e.g., aggregate values, etc.) generated by second data processing system 300. For example, third data processing system 400 may receive encrypted masked aggregate values from second data processing system 300, decrypt the encrypted masked aggregate values to produce masked aggregate values, and send the masked aggregate values to one or more publishers. Third data processing system 400 may include or execute at least one computer program or at least one script. In some implementations, third data processing system 400 includes combinations of software and hardware, such as one or more processors configured to execute one or more scripts.

Third data processing system 400 is shown to include processing circuit 410 having processor 420 and memory 430. Memory 430 may have instructions stored thereon that, when executed by processor 420, cause processing circuit 410 to perform the various operations described herein. Processing circuit 410, processor 420, and/or memory 430 may be similar to processing circuit 14 and 34, processor 16 and 36, and/or memory 18 and 38 as described above. Memory 430 may include encryption circuit 432, randomization circuit 434, and decryption circuit 436.

Encryption circuit 432 may implement one or more encryption functions on input data to produce encrypted data. In some implementations, encryption circuit 432 implements an asymmetric encryption function (e.g., EG, AHE, etc.). In various implementations, encryption circuit 432 is similar to second encryption circuit 42. In some implementations, encryption circuit 432 generates encryption keys. For example, encryption circuit 432 may generate a public key (e.g., an AHE public key) and a secret key (e.g., an AHE secret key). In some implementations, encryption circuit 432 shares the encryption keys with other components of system 100 (e.g., interaction data provider computing system 30, etc.). In various implementations, encryption circuit 432 facilitates various cryptographic functions (e.g., additivity, scalar multiplication, etc.) as described in reference to second encryption circuit 42.

Randomization circuit 434 may receive data and perform various randomization functions to produce randomized data. In various implementations, randomization circuit 434 is similar to randomization circuit 248. In some implementations, randomization circuit 434 facilitates rerandomizing ciphertexts by applying subsequent rounds of encryption. For example, randomization circuit 434 may rerandomize an AHE encrypted value by encrypting the AHE encrypted value a second time with the same key used to encrypt the AHE encrypted value the first time.

Decryption circuit 436 may receive encrypted data and decrypt it to produce unencrypted data. In various implementations, decryption circuit 436 receives encrypted data from second data processing system 300. For example, decryption circuit 436 may receive encrypted aggregate values and/or encrypted masked aggregate values from second data processing system 300. Decryption circuit 436 may decrypt asymmetrically encrypted data. Additionally or alternatively, decryption circuit 436 may decrypt symmetric and/or threshold encrypted data. In various implementations, decryption circuit 436 receives one or more secrets (e.g., secret keys, etc.) from encryption circuit 432. For example, decryption circuit 436 may receive a secret key (e.g., an AHE secret key, etc.) from encryption circuit 432 and use the secret key to at least partially decrypt encrypted data received from second data processing system 300. In some implementations, decryption circuit 436 facilitates collaborative decryption. For example, a number of decryption circuits 436 may work together to decrypt an encrypted data item (e.g., each removing a portion of encryption, etc.).

Figure 2:
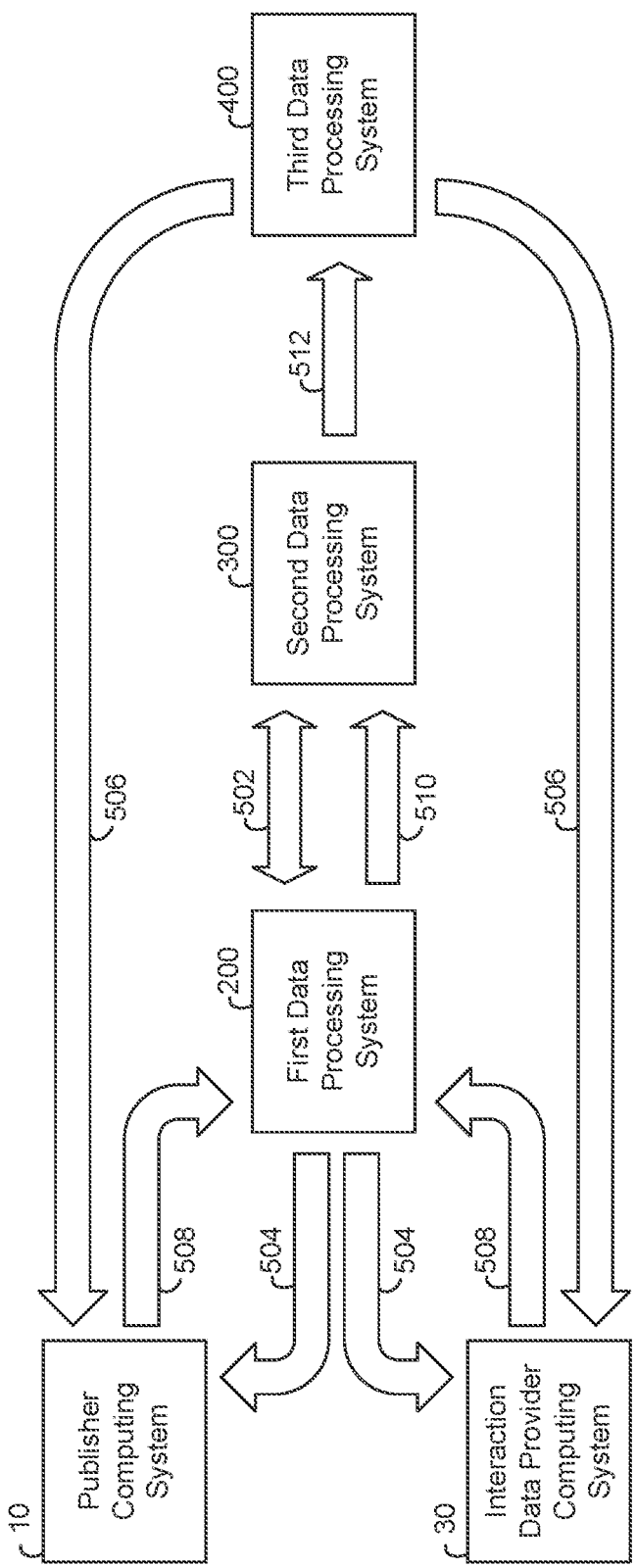
FIG. 2 is a diagram illustrating data transfer and aggregation using the outcome measurement system of FIG. 1A, according to an implementation.

Referring now to FIG. 2, an improved computer architecture for securely transmitting data from different entities and determining aggregate interaction data is shown, according to an illustrative implementation. In brief summary, publishers associated with publisher computing system 10 may provide content items to users using client devices (e.g., smartphones, computers, etc.). In some implementations, the content items are specific to specific users. Interaction data providers associated with interaction data provider computing system 30 may detect when users interact with the content items. For example, a user shown a video may click on the video. It is desirable to measure user interaction with the content items. For example, a publisher providing a video may wish to know how many users clicked on the video. Additionally or alternatively, users may interact with other content provided by a publisher as a result of their interaction with the content items. For example, a user shown a video may later visit a website maintained by the publisher to purchase an item featured in the video. In some implementations, the interaction is or is associated with an online conversion. In various implementations, measuring user interaction with the content items requires comparing information from the publishers (e.g., publisher data, etc.) with information from the interaction data providers (e.g., interaction data, etc.). Therefore, there is a need for a system to securely and anonymously measure user interaction with online content without revealing personal information. A novel cryptography and computer architecture as described herein facilitates secure and anonymous measurement of user interactions with online content without revealing personal information.

At step 502, first data processing system 200 and second data processing system 300 collaboratively generate an EG public key. In some implementations, second data processing system 300 generates the EG public key alone. In some implementations, multiple first data processing systems 200 collaboratively generate the EG public key with second data processing system 300. In various implementations, the EG public key is an EG public key generated by implementing EG encryption over an elliptic curve.

At step 504, first data processing system 200 transmits the EG public key to publisher computing system 10 and interaction data provider computing system 30. Additionally or alternatively, second data processing system 300 may transmit the EG public key to publisher computing system 10 and/or interaction data provider computing system 30. For example, first data processing system 200 and second data processing system 300 may each send the EG public key to publisher computing system 10 and interaction data provider computing system 30 which may verify that the keys received from first data processing system 200 and second data processing system 300 are the same.

At step 506, third data processing system 400 transmits an AHE public key to publisher computing system 10 and interaction data provider computing system 30. At step 508, publisher computing system 10 and interaction data provider computing system 30 transmit data to first data processing system 200. In various implementations, the data is encrypted. For example, a portion of the data may be encrypted with the EG public key and a portion of the data may be encrypted with the AHE public key. In various implementations, publisher computing system 10 transmits encrypted publisher data and interaction data provider computing system 30 transmits encrypted interaction data. In various implementations, the encrypted publisher data includes first encrypted identifiers. In some implementations, the publisher data includes timestamps and/or a count of interactions. In various implementations, the encrypted interaction data includes second encrypted identifiers and encrypted values. In some implementations, the interaction data includes timestamps and/or propensity data. In various implementations, the first and second encrypted identifiers may be encrypted with the EG public key and the encrypted values may be encrypted with the AHE public key.

At step 510, first data processing system 200 transmits data to second data processing system 300. In various implementations, the data is encrypted. For example, a portion of the data may have a first layer of encryption with an EC secret key and a second layer of partial encryption with the EG public key and a portion of the data may have a layer of encryption with the AHE public key. In various implementations, the data includes encrypted publisher data and encrypted interaction data.

At step 512, second data processing system 300 transmits data to third data processing system 400. In various implementations, the data is encrypted. For example, the data may be encrypted with the AHE public key. In some implementations, the data is masked. For example, the data may have a random integer appended. In various implementations, the data includes an encrypted aggregate value. In some implementations, the data includes encrypted publisher credit associated with one or more publishers. In various implementations, third data processing system 400 may transmit the publisher credit to one or more publishers (e.g., publisher computing system 10, etc.).

Figure 3A:
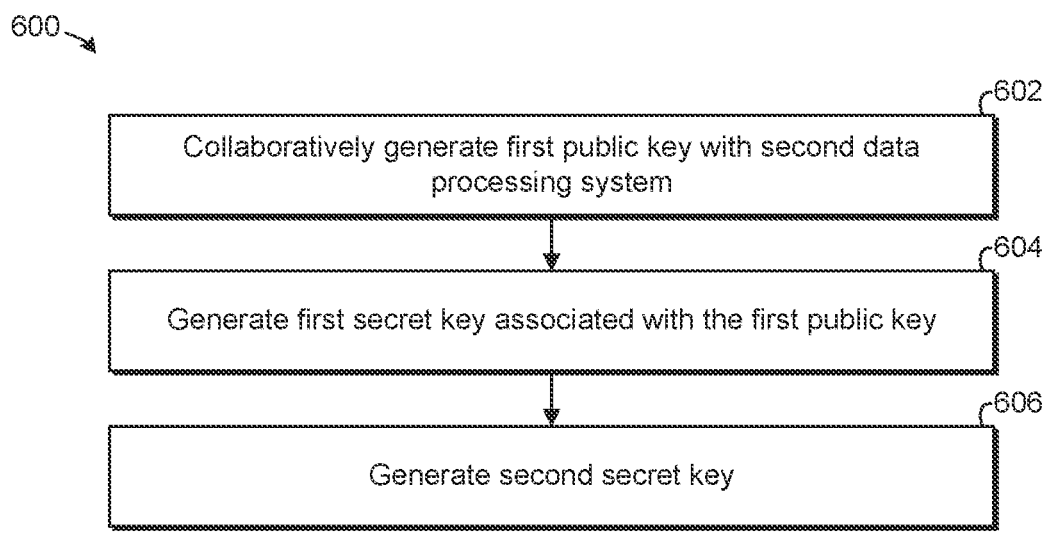
FIG. 3A is a flow diagram illustrating a method of key generation for the first data processing system of FIG. 1A, according to an illustrative implementation.

Referring now to FIGS. 3A-3D, key generation process 600 is shown, according to an illustrative implementation. In various implementations, key generation process 600 (or elements thereof) occurs continuously. For example, system 100 may perform key generation process 600 for each new set of data processed. In some implementations, key generation process 600 occurs periodically. For example, system 100 may perform key generation process 600 every hour, day, week, and/or the like. Referring now specifically to FIG. 3A, key generation process 600 for first data processing system 200 is shown, according to an illustrative implementation. At step 602, first data processing system 200 collaboratively generates a first public key with second data processing system 300. Additionally or alternatively, a number of first data processing systems 200 may collaboratively generate the first public key with second data processing system 300. For example, first data processing system 200 may be a distributed processing system and a number of the distributed components of first data processing system 200 may collaboratively generate the first public key with second data processing system 300. As an additional example, there may be many copies of first data processing system 200 that may collaboratively generate the first public key with second data processing system 300. In various implementations, the first public key is an EG public key. For example, the first public key may be a public key generated by implementing EG encryption over an elliptic curve. In some implementations, step 602 is omitted and second data processing system 300 generates the first public key alone.

At step 604, first data processing system 200 generates a first secret key associated with the first public key. In various implementations, the first secret key is an EG secret key. In some implementations, first data processing system 200 generates a number of first secret keys. For example, first data processing system 200 may be a distributed processing system that collaboratively generates the first public key with second data processing system 300 and a number of the distributed components of first data processing system 200 may each generate their own first secret key. In various implementations, the first secret key and the first public key are a key pair. In some implementations, step 604 is omitted and second data processing system 300 generates the first public key alone.

At step 606, first data processing system 200 generates a second secret key. In various implementations, the second secret key is an EC secret key. For example, the second secret key may be a secret key generated by implementing EC encryption over an elliptic curve. In various implementations, the elliptic curve used to generate the second secret key is the same as or similar to the elliptic curve used to generate the first public key in step 602 above. In some implementations, first data processing system 200 generates a number of second secret keys. For example, first data processing system 200 may be a distributed processing system and a number of the distributed components of first data processing system 200 may each generate their own second secret key.

Figure 3B:
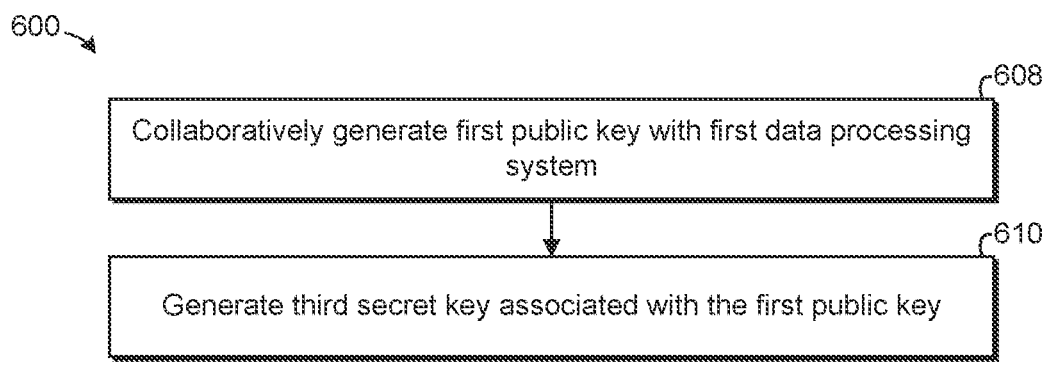
FIG. 3B is a flow diagram illustrating a method of key generation for the second data processing system of FIG. 1A, according to an illustrative implementation.

Referring now specifically to FIG. 3B, key generation process 600 for second data processing system 300 is shown, according to an illustrative implementation. At step 608, second data processing system 300 collaboratively generates a first public key with first data processing system 200. In various implementations, the first public key is an EG public key. In various implementations, the first public key is generated by implementing EG encryption over the same elliptic curve used to generate the second secret key described in step 606 above. In some implementations, second data processing system 300 collaboratively generates the first public key with a number of first data processing systems 200. Additionally or alternatively, second data processing system 300 may generate the first public key alone.

At step 610, second data processing system 300 generates a third secret key associated with the first public key. In various implementations, the third secret key is an EG secret key. In various implementations, the third secret key and the first public key are a key pair.

Figure 3C:
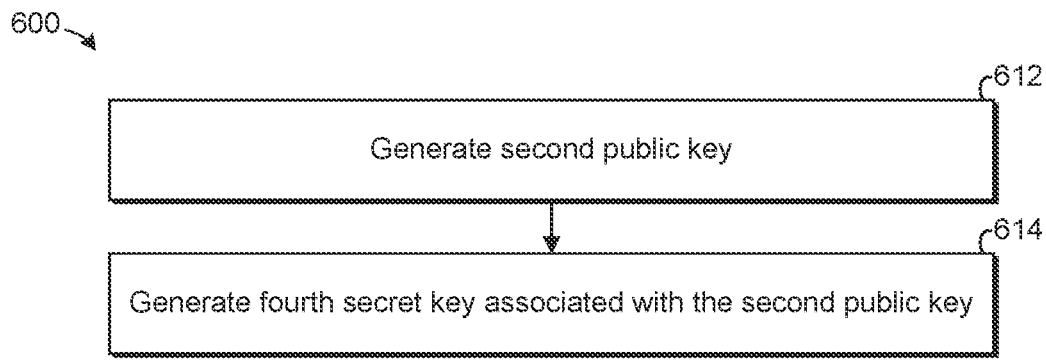
FIG. 3C is a flow diagram illustrating a method of key generation for the third data processing system of FIG. 1A, according to an illustrative implementation.

Referring now specifically to FIG. 3C, key generation process 600 for third data processing system 400 is shown, according to an illustrative implementation. At step 612, third data processing system 400 generates a second public key. In various implementations, the second public key is an AHE public key. In some implementations, third data processing system 400 generates a number of second public keys. For example, third data processing system 400 may be a distributed processing system and a number of the distributed components of third data processing system 400 may each generate their own second public key.

At step 614, third data processing system 400 generates a fourth secret key associated with the second public key. In various implementations, the fourth secret key is an AHE secret key. In some implementations, third data processing system 400 generates a number of fourth secret keys. For example, third data processing system 400 may be a distributed processing system and a number of the distributed components of third data processing system 400 may each generate their own fourth secret key. In various implementations, the fourth secret key and the second public key are a key pair.

Figure 3D:
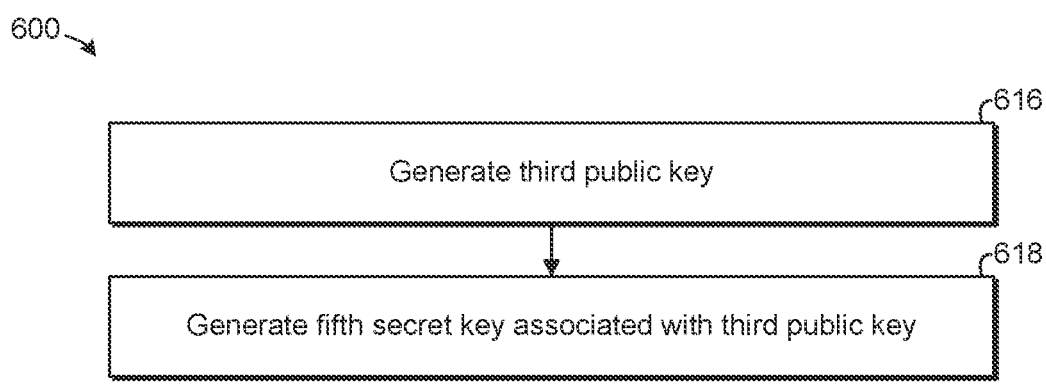
FIG. 3D is a flow diagram illustrating a method of key generation for the publisher computing system of FIG. 1B, according to an illustrative implementation.

Referring now specifically to FIG. 3D, key generation process 600 for publisher computing system 10 is shown, according to an illustrative implementation. In some implementations, publisher computing system 10 does not generate any keys. At step 616, publisher computing system 10 generates a third public key. In various implementations, the third public key is an asymmetric encryption public key. In some implementations, a number of publishers may generate a number of third public keys, each of the third public keys corresponding to one of the number of publishers. In some implementations, step 616 includes generating a number of third public keys each for a different interaction stream (e.g., mobile, web, etc.).

At step 618, publisher computing system 10 generates a fifth secret key associated with the third public key. In various implementations, the fifth secret key is an asymmetric encryption secret key. In various implementations, the fifth secret key and the third public key are a key pair.

Figure 4A:
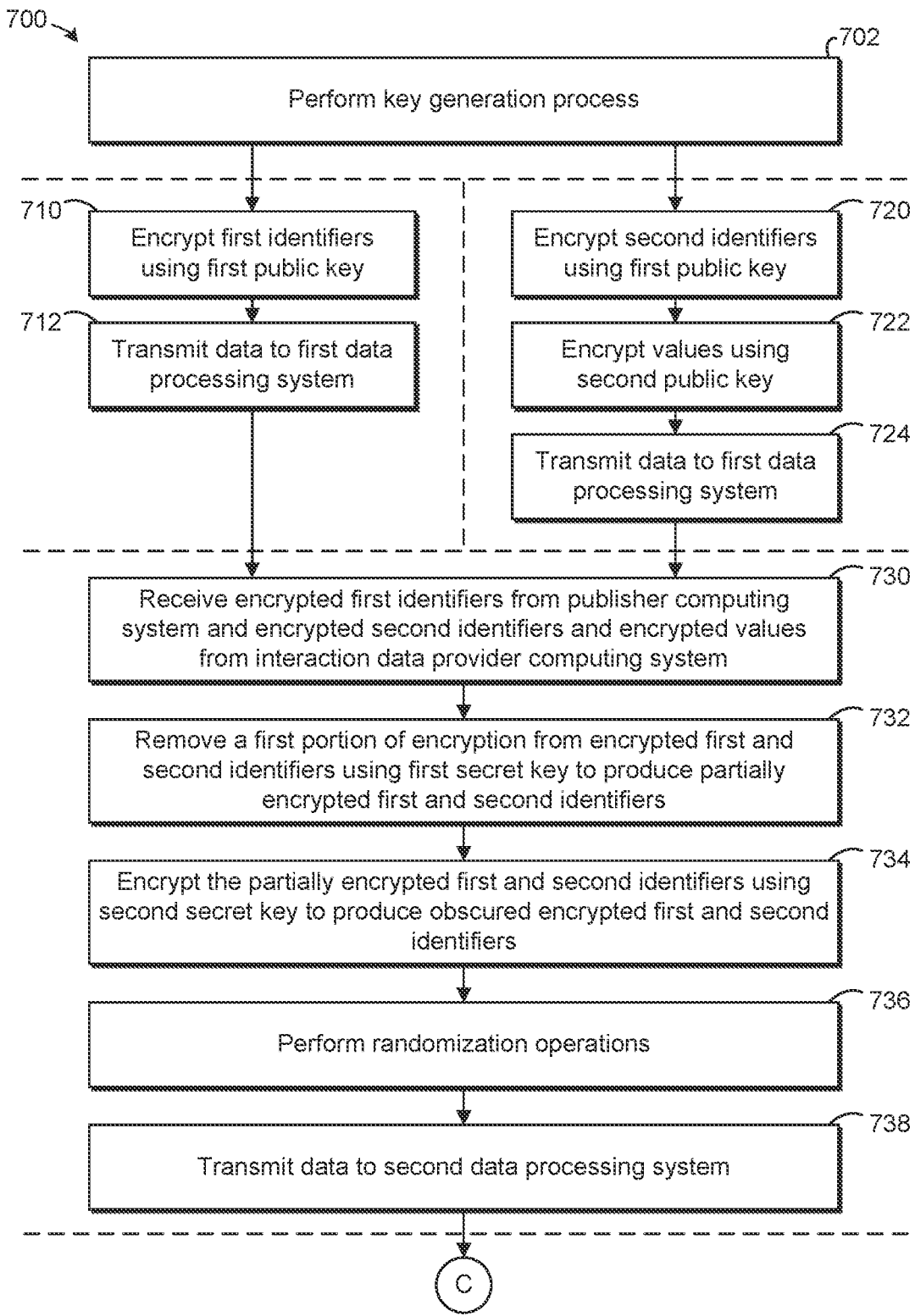
FIGS. 4A-4B is a flow diagram illustrating a method of secure transfer and aggregation of credit for interactions according to the system of FIGS. 1A-1B, according to an illustrative implementation.
Figure 4B:
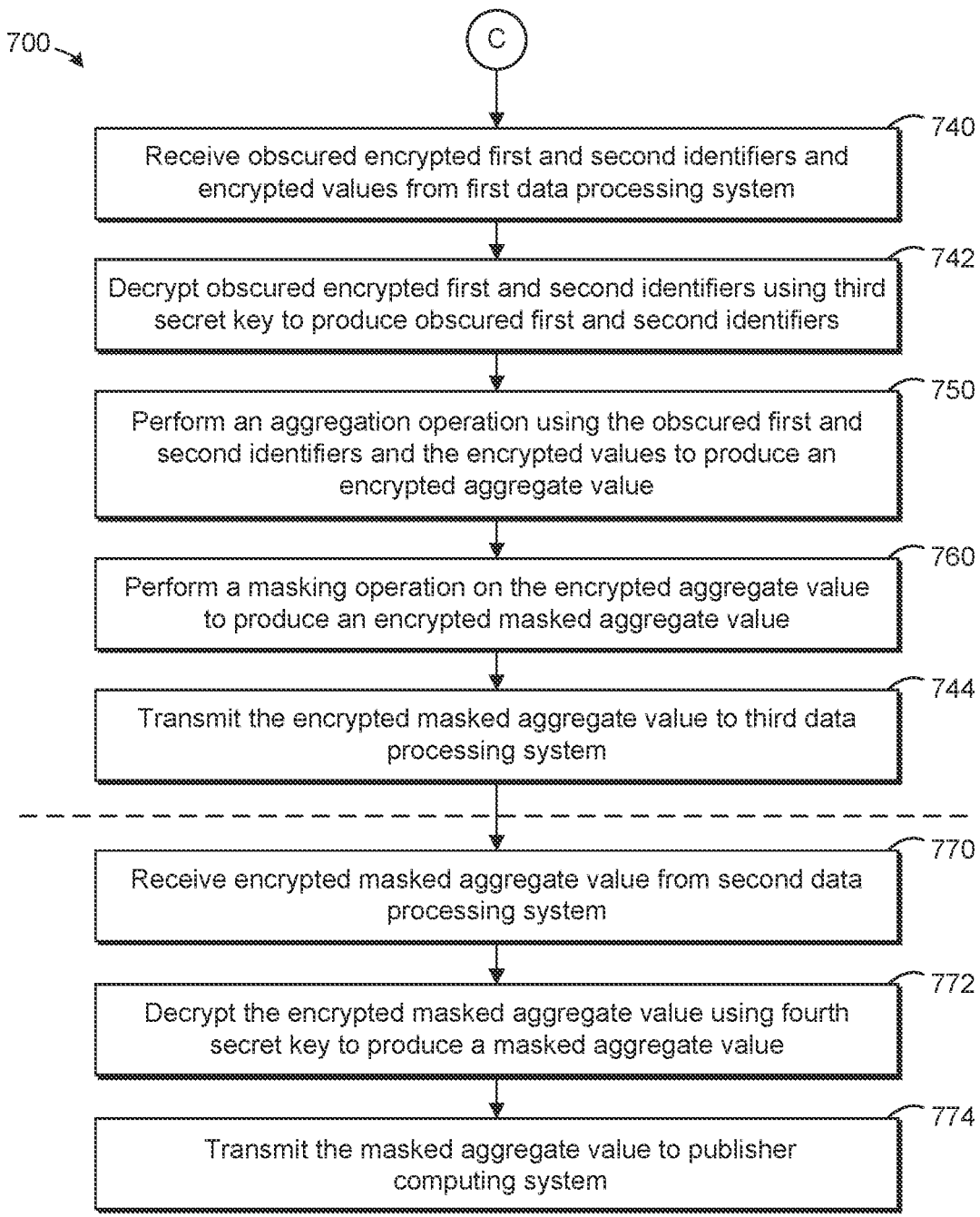
Figure 5:
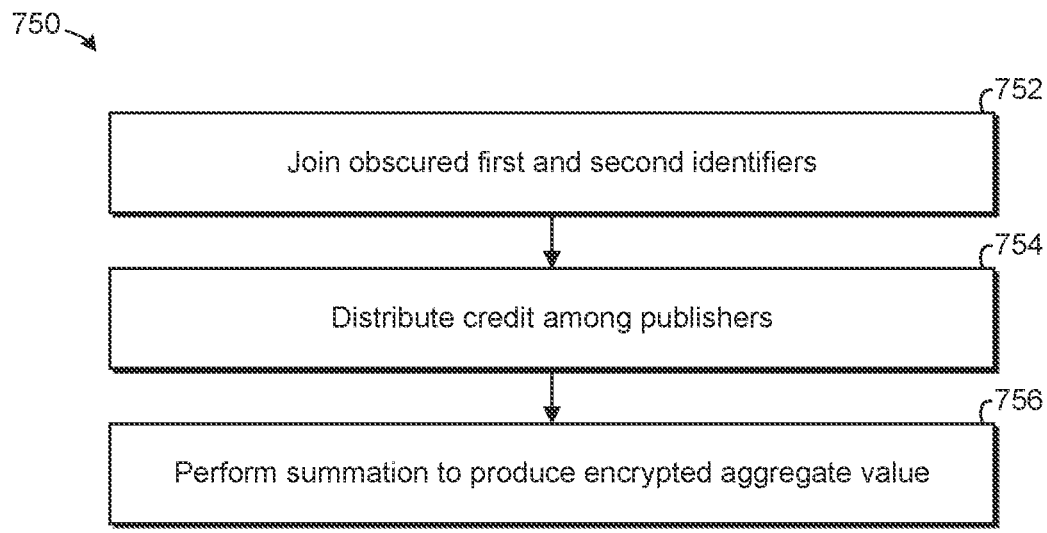
FIG. 5 is a flow diagram illustrating a method of performing the aggregation operation of FIG. 4B, according to an illustrative implementation.

Referring now to FIGS. 4A-4B, method 700 of securely transferring and correlating interaction data is shown, according to an illustrative implementation. At step 702, system 100 performs a key generation process. In various implementations, the key generation process may be performed as described in detail above with reference to FIGS. 3A-3D. At step 710, publisher computing system 10 encrypts first identifiers using a first public key. In various implementations, the first public key is an EG public key received from second data processing system 300. In various implementations, the first identifiers are user identifiers of users who interacted with publisher content (e.g., viewed an ad, clicked on a link, etc.). At step 712, publisher computing system 10 transmits data to first data processing system 200. In various implementations, the data includes encrypted first identifiers. For example, the data may include the first identifiers encrypted using the EG public key from second data processing system 300. In some implementations, the data includes timestamps and/or quantities.

At step 720, interaction data provider computing system 30 encrypts second identifiers using the first public key. In various implementations, the first public key is an EG public key. In various implementations, the second identifiers are user identifiers of users who completed an online interaction (e.g., a purchase, etc.). At step 722, interaction data provider computing system 30 encrypts values using a second public key. In various implementations, the second public key is an AHE public key received from third data processing system 400. In various implementations, the values are value quantities associated with the online interaction completed by the users (e.g., a purchase amount, etc.). At step 724, interaction data provider computing system 30 transmits data to first data processing system 200. In various implementations, the data includes encrypted second identifiers and encrypted values. For example, the data may include second identifiers encrypted using the EG public key from second data processing system 300 and values encrypted using the AHE public key from third data processing system 400. In some implementations, the data includes timestamps and/or propensity data.

At step 730, first data processing system 200 receives encrypted first identifiers from publisher computing system 10 and encrypted second identifiers and encrypted values from interaction data provider computing system 30. In some implementations, first data processing system 200 receives additional information (e.g., timestamps, quantities, propensity data, etc.). At step 732, first data processing system 200 removes a first portion of encryption from encrypted first and second identifiers using a first secret key to produce partially encrypted first and second identifiers. In various implementations, the first secret key is an EG secret key generated by first data processing system 200. For example, first data processing system 200 and second data processing system 300 may collaboratively generate an EG public key that requires a first EG secret key from first data processing system 200 and a second EG secret key from second data processing system 300 to decrypt. In some implementations, step 732 is omitted and second data processing system 300 removes the EG encryption alone. Additionally or alternatively, a number of first data processing systems 200 may collaboratively remove the first portion of encryption from the first and second identifiers. For example, a number of first data processing system 200 and second data processing system 300 may collaboratively generate an EG public key that requires a first number of EG secret keys from each of the number of first data processing systems 200 and a second EG secret key from second data processing system 300 to decrypt. In various implementations, the first portion of encryption is the portion of EG encryption that can be removed by the first EG secret key.

At step 734, first data processing system 200 encrypts the partially encrypted first and second identifiers using a second secret key to produce obscured encrypted first and second identifiers. In various implementations, the second secret key is an EC secret key generated by first data processing system 200. In various implementations, the obscured encrypted first and second identifiers have a first partial layer of EG encryption and a second layer of EC encryption. At step 736, first data processing system 200 performs randomization operations on at least some of the obscured encrypted first identifiers and/or obscured encrypted second identifiers. For example, the randomization operations may include rerandomizing an encryption ciphertext. At step 738, first data processing system 200 transmits data to second data processing system 300. In various implementations, the data includes the obscured encrypted first and second identifiers and encrypted values. In some implementations, the data includes additional information (e.g., timestamps, quantities, propensity data, etc.).

At step 740, second data processing system 300 receives obscured encrypted first and second identifiers and encrypted values from first data processing system 200. In some implementations, second data processing system 300 receives additional information (e.g., timestamps, quantities, propensity data, etc.). At step 742, second data processing system 300 decrypts the obscured encrypted first and second identifiers using a third secret key to produce obscured first and second identifiers. In various implementations, step 742 includes removing a second portion of EG encryption corresponding to an EG secret key held by second data processing system 300. In some implementations, second data processing system 300 removes the entire EG encryption by itself (e.g., without first data processing system 200). In various implementations, the obscured first and second identifiers are EC encrypted first and second identifiers.

At step 750, second data processing system 300 performs an aggregation operation using the obscured first and second identifiers and the encrypted values to produce an encrypted aggregate value. In various implementations, the aggregation operation includes joining the obscured first and second identifiers and distributing credit associated with the encrypted values. The aggregation operation is described in greater detail with reference to FIGS. 5-10 below. In various implementations, the encrypted aggregate value is a value quantity associated with a specific publisher and/or interaction pathway. In various implementations, the encrypted aggregate value includes multiple value quantities (e.g., each associated with a different publisher and/or interaction pathway, etc.). In various implementations, the encrypted aggregate value is encrypted with AHE encryption.

At step 760, second data processing system 300 performs a masking operation on the encrypted aggregate value to produce an encrypted masked aggregate value. In some implementations, the masking operation includes appending random integer. The masking operation is described in greater detail with reference to FIG. 11 below. In some implementations, step 760 is omitted. At step 744, second data processing system 300 transmits the encrypted masked aggregate value to third data processing system 400. In various implementations, the encrypted masked aggregate value may include multiple values (e.g., each associated with a different publisher and/or interaction pathway, etc.).

At step 770, third data processing system 400 receives an encrypted masked aggregate value from second data processing system 300. In various implementations, the encrypted masked aggregate value includes multiple values as described above. At step 772, third data processing system 400 decrypts the encrypted masked aggregate value using a fourth secret key to produce a masked aggregate value. In various implementations, the fourth secret key is an AHE secret key generated by third data processing system 400. In various implementations, the masked aggregate value is an aggregate value having an appended random integer. At step 774, third data processing system 400 transmits the masked aggregate value to publisher computing system 10. In some implementations, step 774 includes transmitting a number of masked aggregate values. For example, third data processing system 400 may transmit a number of masked aggregate values, each associated with a different interaction pathway and/or a different publisher.

Referring now to FIGS. 5-10, step 750 is shown in greater detail, according to an illustrative implementation. In various implementations, second data processing system 300 performs step 750. At step 752, second data processing system 300 joins obscured first and second identifiers. In various implementations, joining obscured first and second identifiers includes comparing ciphertexts of the obscured first and second identifiers. For example, an obscured first identifier having a ciphertext "svf414fal20" may be joined (e.g., matched, etc.) with an obscured second identifier having a ciphertext "svf414fal20." In various implementations, step 752 includes grouping the data into rows by obscured identifiers.

At step 754, second data processing system 300 distributes credit among publishers. Additionally or alternatively, second data processing system 300 may distribute credit among interaction pathways. In various implementations, step 754 includes computing a function across rows to distribute credit. Step 754 is described in greater detail with reference to FIGS. 6-10 below. In various implementations, credit is distributed according to rule based attribution. For example, second data processing system 300 may distribute credit based on a first-impression scheme (e.g., the first interaction receives all the credit), a last-impression scheme (e.g., the last interaction receives all the credit), a linear/equal weight scheme (e.g., each interaction and/or publisher receives an equal portion of the credit), a positional scheme (e.g., a first and/or last interaction receives a first portion of the credit and the remaining interactions receive an equal portion of the remaining credit), a time decay scheme (e.g., similar to the linear/equal weight but including a penalty associated with older interactions), a custom scheme, and/or the like. In some implementations, credit is distributed based on Shapley values. In some implementations, credit is distributed based on a Multivariate Markov Model (MMM). At step 756, second data processing system 300 performs a summation to produce an encrypted aggregate value. In some implementations, step 756 produces a number of value quantities. In various implementations, step 756 includes aggregating along each column.

Figure 6:
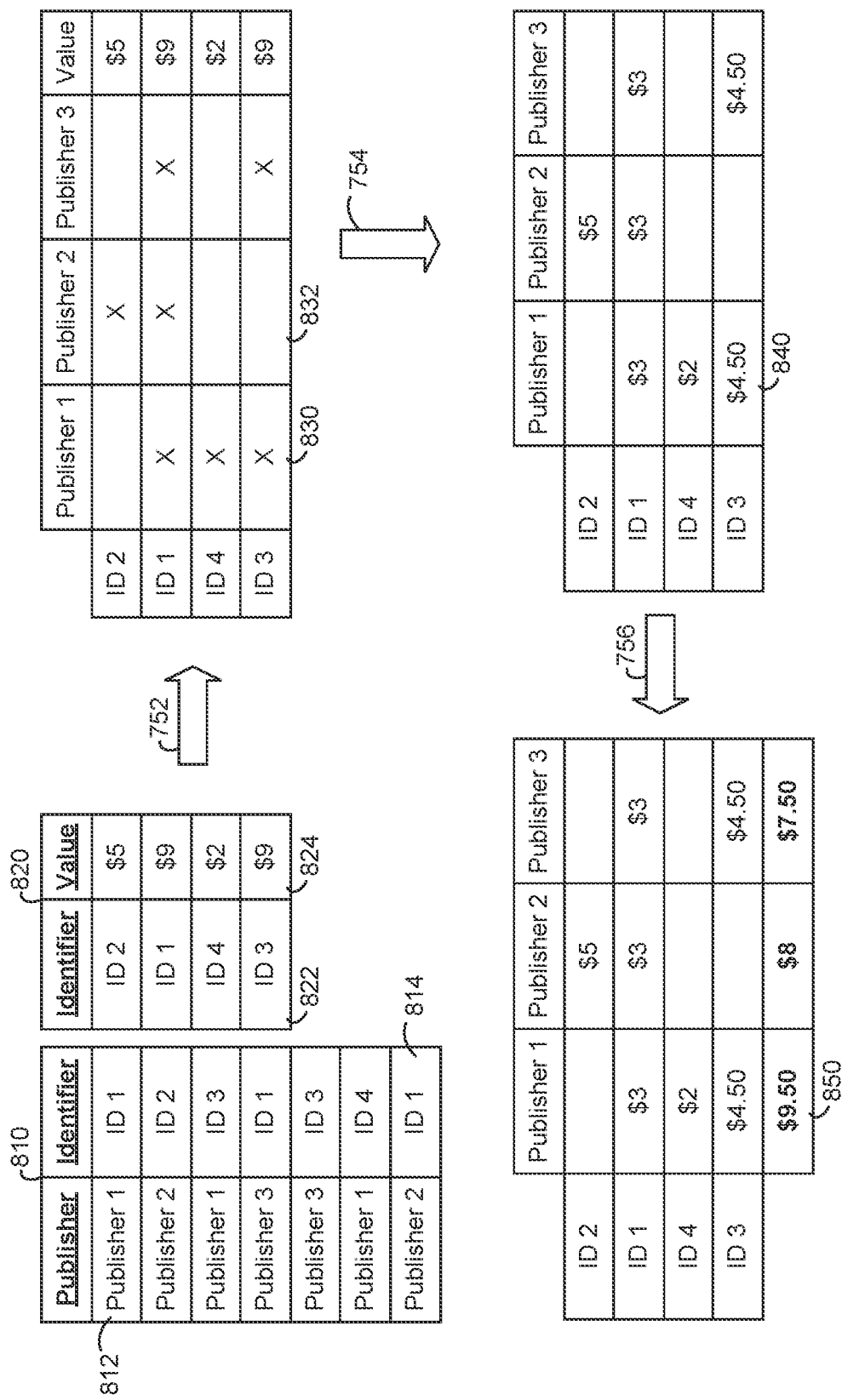
FIG. 6 is a diagram illustrating data set manipulation according to the aggregation operation of FIG. 5, according to an illustrative implementation.

Referring now specifically to FIG. 6, data set manipulation is shown, according to an illustrative implementation. In various implementations, second data processing system 300 may include publisher data 810 and interaction data 820. In various implementations, publisher data 810 includes first identifiers 814. First identifiers 814 may be EC encrypted. In some implementations, first identifiers 814 are device identifiers. Additionally or alternatively, first identifiers 814 may be or include another identifier such as an identifier associated with a user account. First identifiers 814 are shown as numbers, however it should be understood that first identifiers 814 may be alphanumeric ciphertexts. In various implementations, first identifiers 814 are associated with publisher identifier 812. Publisher identifier 812 may identify a source of an associated first identifier 814. In some implementations, publisher data includes an interaction pathway identifier. In various implementations, interaction data 820 includes second identifiers 822 and values 824. Second identifiers 822 may be EC encrypted. Values 824 may be AHE encrypted. As described above, second identifiers 822 and values 824 are shown as names and dollar amounts respectively, however it should be understood that second identifiers 822 and values 824 are alphanumeric ciphertexts. In various implementations, values 824 are associated with second identifiers 822. In various implementations, second identifiers 822 are associated with first identifiers 814. In various implementations, publisher data 810 and/or interaction data 820 is unstructured data (e.g., unsorted, etc.) when received by second data processing system 300.

At step 752, second data processing system 300 joins obscured first and second identifier (e.g., first identifiers 814 and second identifiers 822). Step 752 may include grouping the data into rows by matching first and second identifiers 814 and 822. In various implementations, second data processing system 300 determines whether a publisher recorded an interaction 830 with a user or did not record an interaction 832 with a user based on the joined first and second identifiers 814 and 822. For example, second data processing system 300 may determine that publisher 1 and 3 displayed publisher content to "ID 3" and publisher 2 did not. In various implementations, second data processing system 300 determines a specific value (e.g., of values 824) that corresponds to a row based on matching first and second identifiers 814 and 822. It should be understood that although the data is shown as corresponding to different publishers, the data may additionally or alternatively correspond to different interaction pathways.

At step 754, second data processing system 300 distributes credit 840 among publishers. In some implementations, credit 840 is part or all of values 824. In some implementations, second data processing system 300 evenly distributes credit 840 among publishers. For example, second data processing system 300 may determine that publisher 1 and 3 displayed publisher content to "ID 3" and publisher 2 did not and may evenly distribute "$9" of value associated with "ID 3" between publisher 1 and 3 (e.g., "$4.50" to each, etc.). Additionally or alternatively, second data processing system 300 may distribute value using a custom process (e.g., tailored rules, etc.). For example, second data processing system 300 may distribute a majority percentage of value to a first publisher that displayed content to the user first and may distribute a minority percentage of value amongst various other publishers that displayed content to the user after the first publisher.

At step 756, second data processing system 300 performs a summation to produce aggregate value 850. Step 756 may include aggregating along each column. For example, second data processing system 300 may sum a collection of credit 840 associated with publisher 1 to determine aggregate value 850. In various implementations, second data processing system 300 determines an aggregate value 850 for each publisher. Additionally or alternatively, second data processing system 300 may determine an aggregate value for each interaction pathway.

Figure 7:
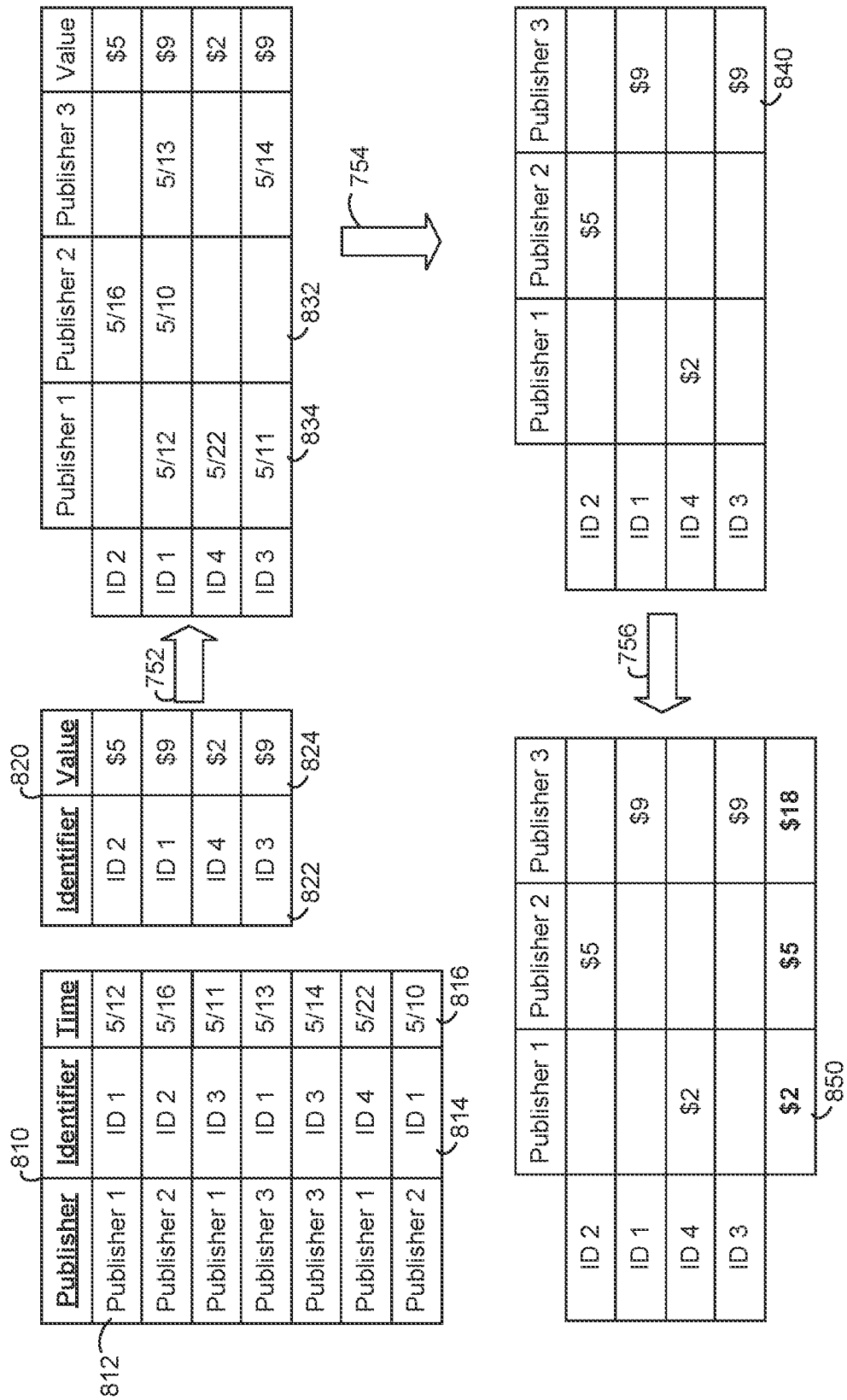
FIG. 7 is another diagram illustrating data set manipulation according to the aggregation operation of FIG. 5, according to an illustrative implementation.

Referring now specifically to FIG. 7, data set manipulation is shown, according to an illustrative implementation. In various implementations, the data set manipulation of FIG. 7 is similar to the data set manipulation of FIG. 6. Publisher data 810 may include time 816. Time 816 may be associated with a time that a user associated with first identifier 814 interacted with publisher content. In various implementations, time 816 includes a timestamp. In some implementations, time 816 is truncated (e.g., to the hour, day, etc.) and/or batched, thereby preserving personal information.

In various implementations, step 752 is performed as described above. In various implementations, second data processing system 300 determines an interaction time 834 associated with each publisher interaction. For example, second data processing system 300 may determine that publisher 1 displayed publisher content to "ID 3" on "5/11," publisher 3 displayed publisher content to "ID 3" on "5/14," and publisher 2 did not record an interaction 832. At step 754, second data processing system 300 may distribute credit 840 among publishers according to a last-clicked attribution scheme. For example, second data processing system 300 may distribute an entire value quantity associated with "ID 3" to publisher 3 because publisher 3 was the last publisher to display publisher content to "ID 3." Additionally or alternatively, second data processing system 300 may distribute credit 840 among publishers according to a first-clicked attribution scheme. In various implementations, step 756 is performed as described above.

Figure 8:
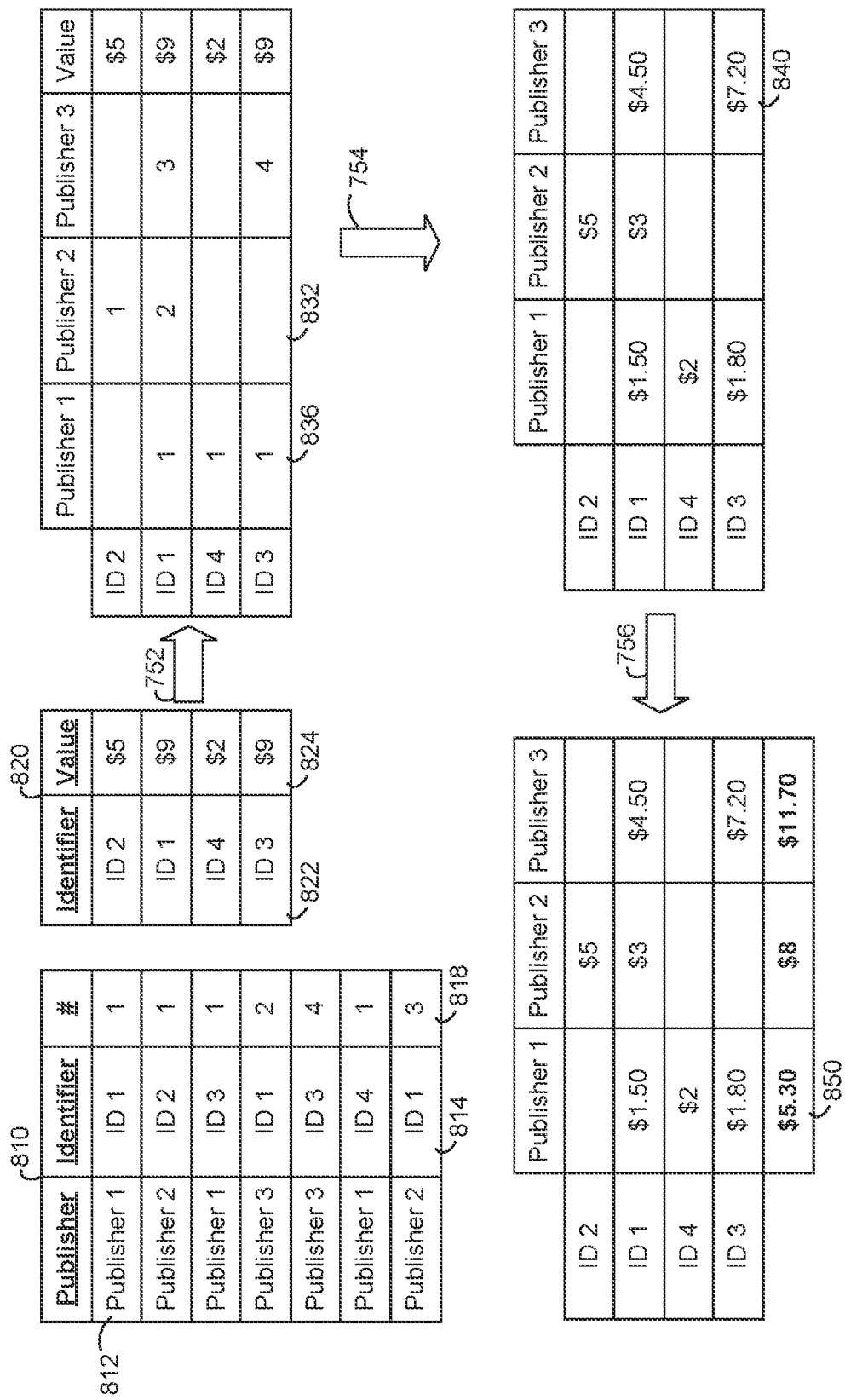
FIG. 8 is another diagram illustrating data set manipulation according to the aggregation operation of FIG. 5, according to an illustrative implementation.

Referring now specifically to FIG. 8, data set manipulation is shown, according to an illustrative implementation. In various implementations, the data set manipulation of FIG. 8 is similar to the data set manipulation of FIG. 6. Publisher data 810 may include quantity 818. Quantity 818 may be associated with a number of times that a publisher recorded an interaction with a user (e.g., displayed publisher content to a user, etc.).

In various implementations, step 752 is performed as described above. In various implementations, second data processing system 30) determines an interaction quantity 836 associated with each publisher interaction. For example, second data processing system 300 may determine that publisher 1 displayed publisher content to "ID 3" once, publisher 3 displayed publisher content to "ID 3" four times, and publisher 2 did not record an interaction 832. At step 754, second data processing system 300 may distribute credit 840 among publishers based on interaction quantity 836. For example, second data processing system 300 may weight credit 840 based on interaction quantity 836. As an additional example, second data processing system 300 may distribute four-fifths of a value quantity associated with "ID 3" to publisher 3 and one-fifth of the value quantity associated with "ID 3" to publisher 1 because publisher 3 recorded four-fifths of the total user interactions associated with "ID 3" and publisher 1 recorded one-fifth of the total user interaction associated with "ID 3". In various implementations, step 756 is performed as described above.

Figure 9:
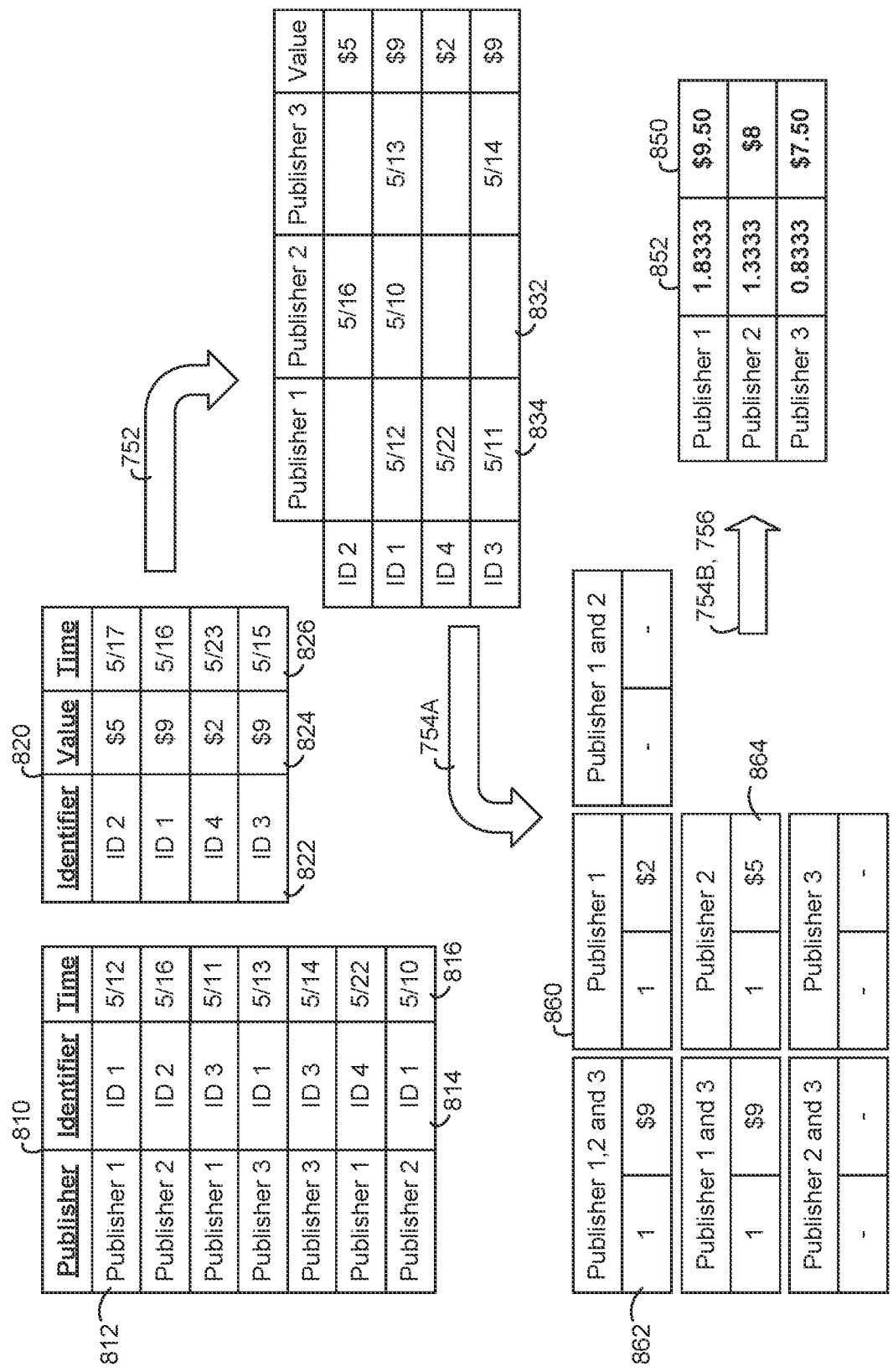
FIG. 9 is a diagram illustrating generation of Shapley values according to the aggregation operation of FIG. 5, according to an illustrative implementation.

Referring now specifically to FIG. 9, generation of Shapley values is shown, according to an illustrative implementation. Interaction data 820 may include time 826. Time 826 may be associated with a time that a user associated with second identifier 822 performed an online interaction (e.g., a purchase, etc.). In various implementations, time 826 includes a timestamp. In some implementations, time 826 is truncated (e.g., to the hour, day, etc.) and/or batched, thereby preserving personal information (e.g., maintaining privacy and security, etc.). In various implementations, step 752 is performed as described above to determine interaction time 834.

At step 754A, second data processing system 300 determines a number of interactions 862 and a total value 864 associated with each pathway 860. For example, a first pathway 860 may include interactions for which a user interacted with publisher content from publisher 1, 2, and 3 while a second pathway 860 may include interactions for which a user interacted with publisher content only from publisher 1. In some implementations, pathways 860 describe a type of interaction. For example, a first pathway 860 may include mobile and web interactions and a second pathway may include link-referrals. In various implementations, number of interactions 862 is a sum of a number of users that were recorded as interacting with the elements defined in the specific pathway 860. In various implementations, pathways 860 are unordered (e.g., non-sequential, etc.).

At step 754B, second data processing system 300 determines a Shapley value 852. Shapley value 852 may describe an average marginal contribution of a publisher across all possible pathways 860. In various implementations, second data processing system 300 computes Shapley value 852 as:

$$\varphi_j = \sum_{S \subseteq P\{x_j\}} \frac{1}{|S|+1} R(S \cup \{x_j\}), j = 1, ..., p$$

where $\varphi_j$ is the Shapley value 852 for $x_j$, where $x_j$ is a user interaction (e.g., a first identifier 814 associated with a publisher identifier 812), where j is an index of the total number of publishers p, where P is the set of all user interactions, where $S \subseteq P\{x_j\}$ is one subset of user interactions which must include interaction $x_j$, and where $R(S \cup \{x_j\})$ is the credit distributed to the specific pathway 860.

For example, the Shapley value 852 for publisher 1 may be computed as:

$$\varphi_1 = R(\text{number associated with Publisher 1}) +$$

$$\frac{1}{2} R(\text{number associated with Publisher 1 and 2}) +$$

$$\frac{1}{2} R(\text{number associated with Publisher 1 and 3}) +$$

$$\frac{1}{3} R(\text{number associated with Publisher 1, 2, and 3}) =$$

$$1 + \frac{1}{2}(0) + \frac{1}{2}(1) + \frac{1}{3}(1) = 1.8333$$

Additionally or alternatively, the Shapley value 852 may be computed as an aggregate value 850. For example, the aggregate value 850 may be computed as:

$$\varphi_1 = R(\$ \text{ associated with Publisher 1}) +$$

$$\frac{1}{2} R(\$ \text{ associated with Publisher 1 and 2}) +$$

$$\frac{1}{2} R(\$ \text{ associated with Publisher 1 and 3}) +$$

$$\frac{1}{3} R(\$ \text{ associated with Publisher 1, 2, and 3}) =$$

$$\$2 + \frac{1}{2}(\$0) + \frac{1}{2}(\$9) + \frac{1}{3}(\$9) = \$9.50$$

In some implementations, step 754B includes step 756. Additionally or alternatively, aggregate value 850 may be calculated based on propensity scores. For example, second data processing system 300 may group the data based on propensity scores and may determine aggregate value 850 based on the groupings of data.

Figure 10:
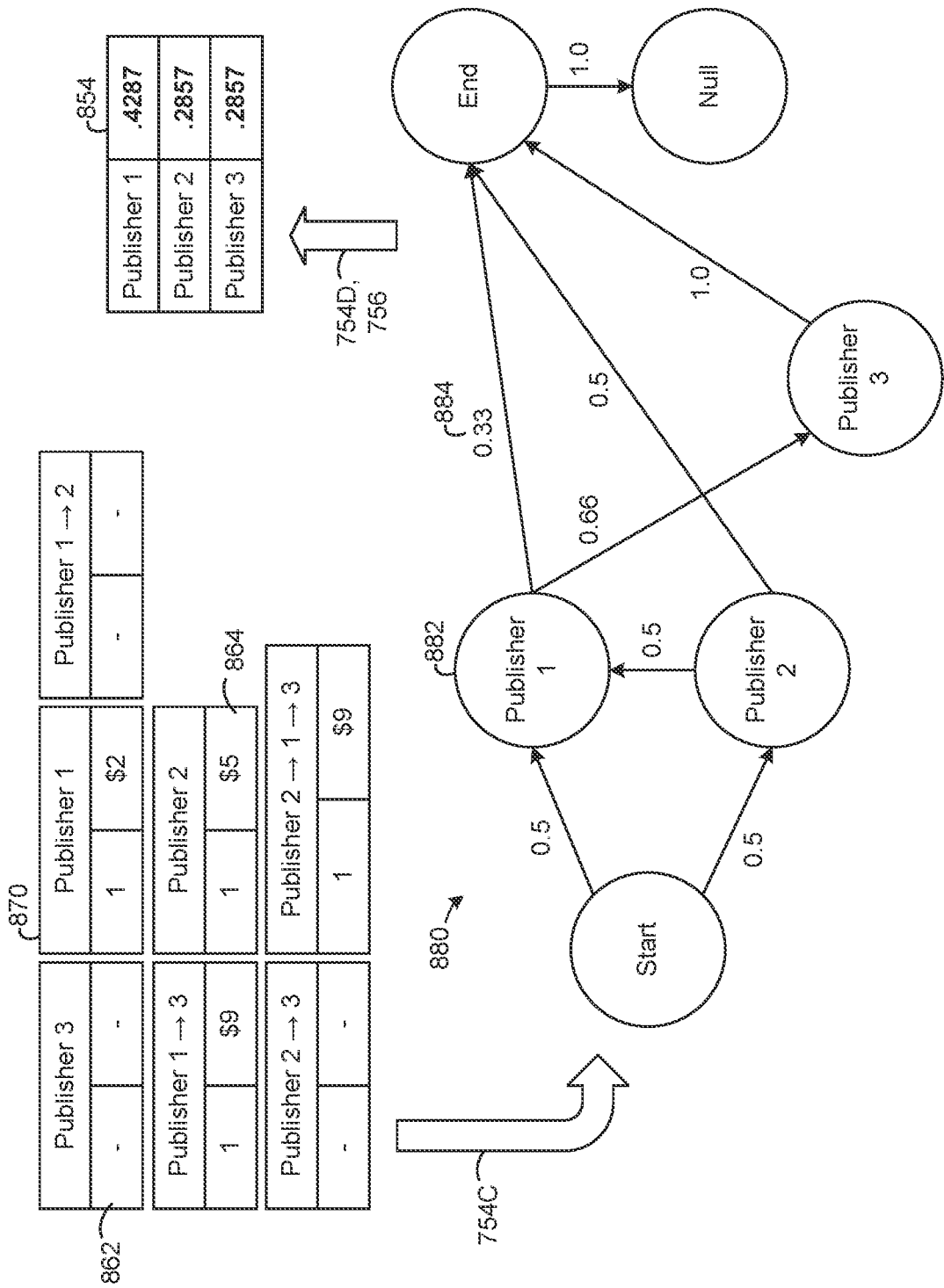
FIG. 10 is a diagram illustrating generation of a Markov Model according to the aggregation operation of FIG. 5, according to an illustrative implementation.

Referring now to FIG. 10, generation of a Markov Model is shown, according to an illustrative implementation. In various implementations, step 752 is performed as described above. In various implementations, second data processing system 300 determines a number of interactions 862 and a total value 864 associated with a number of pathways 870. For example, a first pathway 870 may include interactions for which a user interacted with publisher content from publisher 1, followed by publisher content from publisher 2, and followed by publisher content from publisher 3 while a second pathway 870 may include interactions for which a user interacted with publisher content only from publisher 1. In various implementations, pathways 870 are ordered (e.g., sequential, etc.).

At step 754C, second data processing system 300 generates Markov Model 880. Markov Model 880 may model pathways 870 as a journey through a sequence of states. Markov Model 880 may include nodes 882 and connections 884. Nodes 882 may represent interactions. For example, a user may interact with publisher content from publisher 1 followed by publisher 3 before performing an online interaction (e.g., a purchase, etc.). In various implementations, Markov Model 880 includes a start, end, and null node 882. The start node 882 may represent a starting place (e.g., before a user has interacted with publisher content, etc.). The end node 882 may represent a user that has performed an online interaction. The null node 882 may represent a user that has not performed an online interaction. Connections 884 may represent a probability of transitioning from a first node 882 to a second node 882. In various implementations, second data processing system 300 determines the probabilities of connections 884 empirically (e.g., based on publisher data 810 and interaction data 820).

At step 754D, second data processing system 300 generates removal effects 854. Removal effects 854 may model the contribution of a publisher by comparing a number of online interactions that occur with a specific publisher present to a number of online interactions that occur without the specific publisher present. In various implementations, second data processing system 300 computes removal effects 854 as:

$$RE(i) = R - \Sigma ppr_i$$

where RE(i) is the removal effect 854 for an entity associated with node 882 i, where R is a total interaction rate (e.g., a percentage of users that eventually performed an online interaction, etc.), and where $ppr_i$ is a pathway probability associated with node 882 i. For example, the $ppr_i$ of Start→Publisher 1→End is 0.5*0.33=0.16. In some implementations, step 754D includes step 756.

In various implementations, second data processing system 300 generates removal effect 854 as a percentage of the sum of removal effects 854. For example, removal effect 854 may be computed as:

$$RE_\%(i) = \frac{RE(i)}{\Sigma RE(i)}$$

Figure 11:
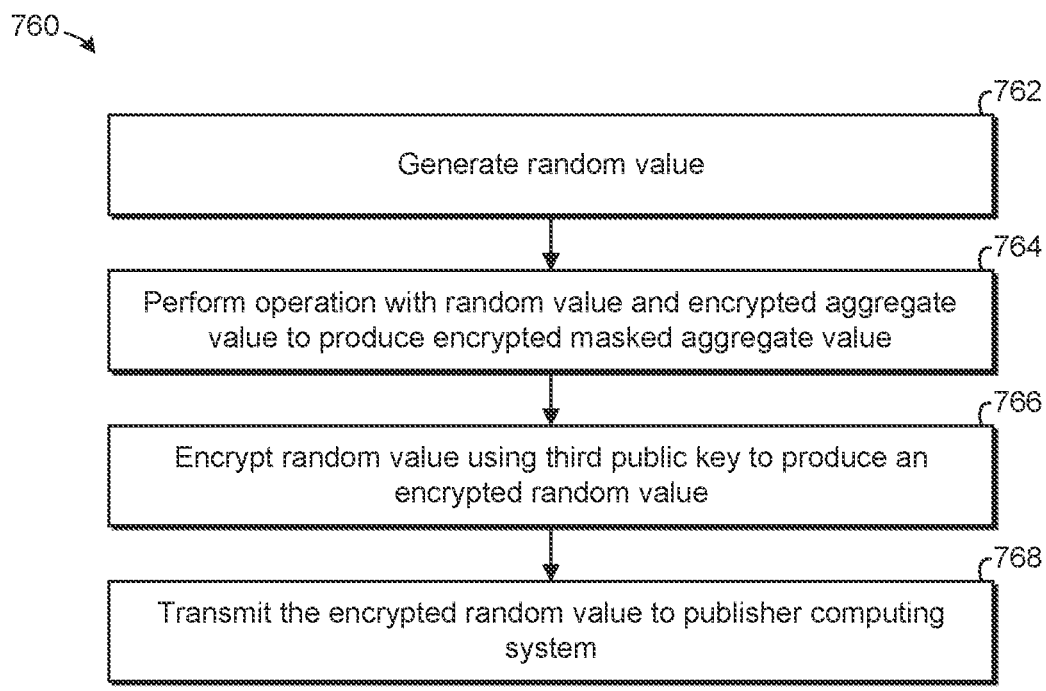
FIG. 11 is a flow diagram illustrating a method of performing the masking operation of FIG. 4B, according to an illustrative implementation.

Referring now to FIG. 11, step 760 of performing a masking operation is shown, according to an illustrative implementation. In various implementations, second data processing system 300 performs step 760. At step 762, second data processing system 300 generates a random value. In various implementations, the random value is a large random value (e.g., 128-bits or longer, etc.). In various implementations, step 762 includes generating multiple random values. For example, second data processing system 300 may generate a random value for each destination of the masked aggregate values (e.g., for each publisher, etc.).

At step 764, second data processing system 300 performs an operation with the random value and an encrypted aggregate value to produce an encrypted masked aggregate value. In various implementations, the operation includes appending the random value to the encrypted aggregate value. At step 766, second data processing system 300 encrypts the random value using a third public key to produce an encrypted random value. In various implementations, the third public key is an asymmetric encryption public key from publisher computing system 10. At step 768, second data processing system 300 transmits the encrypted random value to publisher computing system 10. In various implementations, steps 766 and 768 may be repeated for each of the random values and/or destinations (e.g., for each publisher, etc.).

Figure 12:
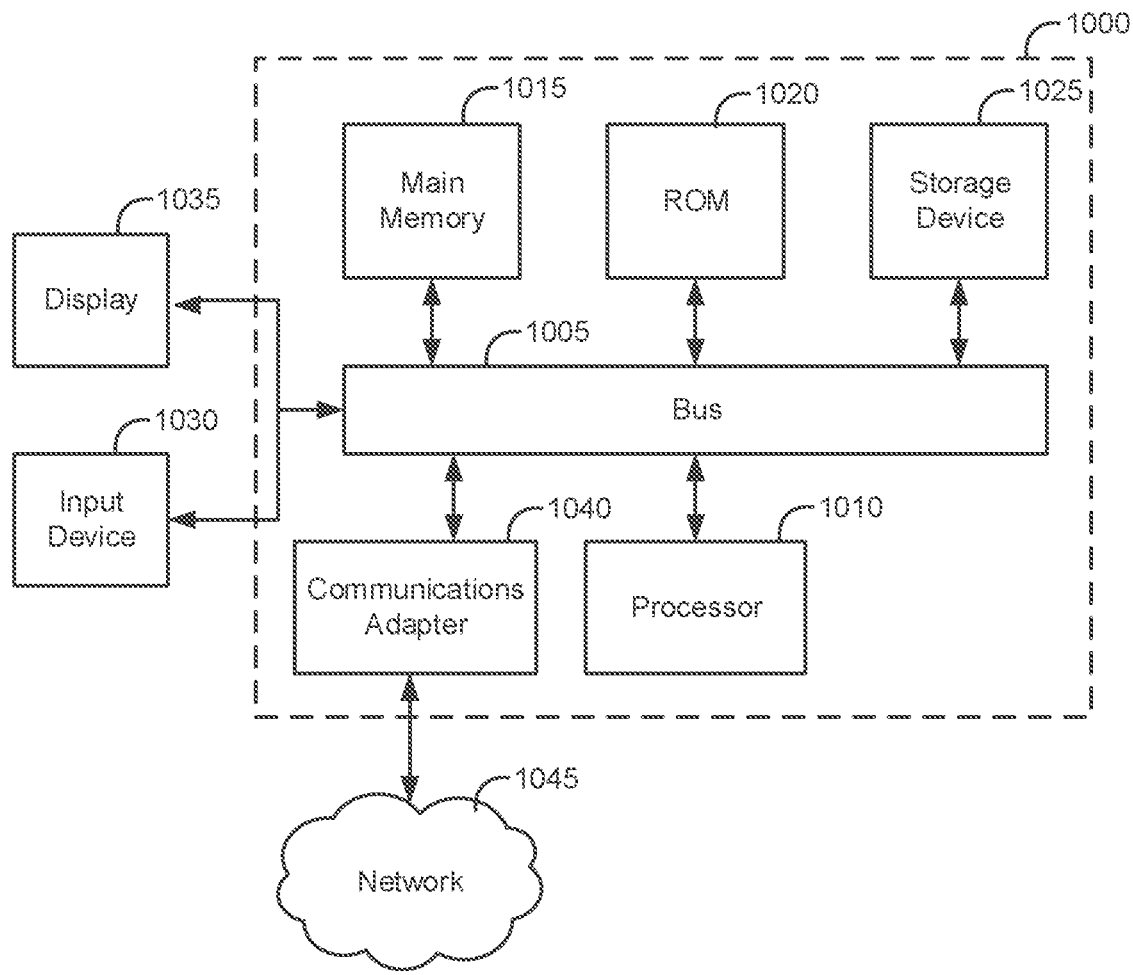
FIG. 12 is a block diagram of a computing system, according to an illustrative implementation.

FIG. 12 illustrates a depiction of a computing system 1000 that can be used, for example, to implement any of the illustrative systems (e.g., system 100, etc.) described in the present disclosure. The computing system 1000 includes a bus 1005 or other communication component for communicating information and a processor 1010 coupled to the bus 1005 for processing information. The computing system 1000 also includes main memory 1015, such as a random access memory ("RAM") or other dynamic storage device, coupled to the bus 1005 for storing information, and instructions to be executed by the processor 1010. Main memory 1015 can also be used for storing position information, temporary variables, or other intermediate information during execution of instructions by the processor 1010. The computing system 1000 may further include a read only memory ("ROM") 1020 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information, and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

In some implementations, the computing system 1000 may include a communications adapter 1040, such as a networking adapter. Communications adapter 1040 may be coupled to bus 1005 and may be configured to enable communications with a computing or communications network 1045 and/or other computing systems. In various illustrative implementations, any type of networking configuration may be achieved using communications adapter 1040, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In alternative implementations, hard-wired circuitry may be used in place of or in combination with software instructions to implement illustrative implementations. Thus, implementations are not limited to any specific combination of hardware circuitry and software.

Although an example processing system has been described in FIG. 12, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed.

Systems and methods of the present disclosure offer many benefits over existing systems. To avoid revealing personal information differential privacy may require that aggregated interaction measurements must not reveal if a particular individual's information was included in calculating interaction rates. Therefore, a privacy protected method of measuring aggregate interactions and distributing credit among multiple publishers is needed.

One solution utilizes an outcome measurement service. The outcome measurement service may join publisher data and interaction data to determine an aggregate credit associated with an online interaction. Moreover, the outcome measurement service may securely distribute credit associated with the online interaction between the publishers using a unique cryptography and computer-architecture methodology as described herein. In various implementations, the outcome measurement service described herein improves the field of interaction measurements. Moreover, the outcome measurement service may securely determine aggregate measurements more quickly and with greater security than traditional systems, thereby improving the functioning of existing computer systems.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable television channel, on a satellite television channel, or stored on a local hard drive. A set-top box ("STB") or set-top unit ("STU") may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving, at a first computing system, encrypted identifiers and encrypted values;
   performing, by the first computing system, a concealing operation on the encrypted identifiers to produce concealed encrypted identifiers, wherein the concealing operation conceals the encrypted identifiers from the first computing system and a second computing system but enables matching between the concealed encrypted identifiers;
   decrypting, by the second computing system, the concealed encrypted identifiers to produce concealed identifiers;
   performing, by the second computing system, an aggregation operation using the concealed identifiers and the encrypted values to produce an encrypted aggregate value without accessing personal information associated with the encrypted values;
   decrypting, by a third computing system, the encrypted aggregate value to produce an aggregate value;
   cooperatively generating by the first computing system and the second computing system a first encryption key;
   generating by the first computing system a second encryption key associated with the first encryption key and a third encryption key;
   generating by the second computing system a first decryption key associated with the first encryption key; and
   generating by the third computing system a second decryption key and a fourth encryption key.

2. The method of claim 1, wherein performing the concealing operation includes:
   removing a first portion of first encryption from the encrypted identifiers to produce partially encrypted identifiers; and
   deterministically encrypting the partially encrypted identifiers with second encryption to produce the concealed encrypted identifiers.

3. The method of claim 2, wherein decrypting the concealed encrypted identifiers includes removing a second portion of the first encryption from the concealed encrypted identifiers to produce the concealed identifiers.

4. The method of claim 1, wherein the encrypted identifiers are encrypted using the first encryption key and the encrypted values are encrypted using the fourth encryption key, wherein the concealing operation uses the second and third encryption keys, wherein the concealed encrypted identifiers are decrypted using the first decryption key, and wherein the encrypted aggregate value is decrypted using the second decryption key.

5. The method of claim 1, wherein the concealing operation includes shuffling the encrypted identifiers and rerandomizing the encrypted values by generating a ciphertext using a hash function.

6. The method of claim 1, wherein the third computing system and the first computing system are a part of the same outcome measurement system.

7. The method of claim 1, wherein at least one of the first computing system or the third computing system is a distributed computing system.

8. The method of claim 1, further comprising:
generating, by the second computing system, a random value;
performing, by the second computing system, an operation using the random value and the encrypted aggregate value to produce a result; and
sending, by the second computing system, the random value to a content publisher associated with the encrypted identifiers.

9. The method of claim 1, wherein the aggregation operation includes performing a weighting function using the concealed identifiers and time values associated with the concealed identifiers to produce the encrypted aggregate value.

10. One or more computer-readable storage media having instructions stored thereon that, upon execution by one or more processors of at least one of a first computing system, a second computing system, and a third computing system:
cause the first computing system to:
receive encrypted identifiers and encrypted values; and
perform a concealing operation on the encrypted identifiers to produce concealed encrypted identifiers, wherein the concealing operation conceals the encrypted identifiers from the first computing system and a second computing system but enables matching between the concealed encrypted identifiers;
cause the second computing system to:
decrypt the concealed encrypted identifiers to produce concealed identifiers; and
perform an aggregation operation using the concealed identifiers and the encrypted values to produce an encrypted aggregate value without accessing personal information associated with the encrypted values;
cause the third computing system to decrypt the encrypted aggregate value to produce an aggregate value;
cause the first computing system and the second computing system to cooperatively generate a first encryption key;
cause the first computing system to generate a second encryption key associated with the first encryption key and a third encryption key;
cause the second computing system to generate first decryption key associated with the first encryption key; and
cause the third computing system to generate a second decryption key and a fourth encryption key.

11. The one or more computer-readable storage media of claim 10, wherein performing the concealing operation includes:
removing a first portion of first encryption from the encrypted identifiers to produce partially encrypted identifiers; and
deterministically encrypting the partially encrypted identifiers with second encryption to produce the concealed encrypted identifiers.

12. The one or more computer-readable storage media of claim 11, wherein descripting the concealed encrypted identifiers includes removing a second portion of the first encryption from the concealed encrypted identifiers to produce the concealed identifiers.

13. The one or more computer-readable storage media of claim 11, wherein the encrypted identifiers are encrypted using the first encryption key and the encrypted values are encrypted using the fourth encryption key, wherein the concealing operation uses the second and third encryption keys, wherein the concealed encrypted identifiers are decrypted using the first decryption key, and wherein the encrypted aggregate value is decrypted using the second decryption key.

14. The one or more computer-readable storage media of claim 11, wherein the third computing system and the first computing system are a part of the same outcome measurement system.

15. The one or more computer-readable storage media of claim 11, wherein at least one of the first computing system or the third computing system is a distributed computing system.

16. The one or more computer-readable storage media of claim 10, wherein the aggregation operation includes performing a weighting function using the concealed identifiers and time values associated with the concealed identifiers to produce the encrypted aggregate value.

* * * * *